US010621955B2

(12) United States Patent
Heo et al.

(10) Patent No.: US 10,621,955 B2
(45) Date of Patent: Apr. 14, 2020

(54) WEARABLE TERMINAL FOR DISPLAYING SCREEN OPTIMIZED FOR VARIOUS SITUATIONS

(71) Applicant: LG ELECTRONICS INC., Seoul (KR)

(72) Inventors: Jeongyun Heo, Seoul (KR); Yung Kim, Seoul (KR); Huran Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,313

(22) PCT Filed: May 28, 2015

(86) PCT No.: PCT/KR2015/005361
§ 371 (c)(1),
(2) Date: Nov. 27, 2017

(87) PCT Pub. No.: WO2016/190466
PCT Pub. Date: Dec. 1, 2016

(65) Prior Publication Data
US 2018/0166044 A1 Jun. 14, 2018

(51) Int. Cl.
*G06F 13/14* (2006.01)
*G09G 5/36* (2006.01)
(Continued)

(52) U.S. Cl.
CPC ......... *G09G 5/363* (2013.01); *A63B 24/0003* (2013.01); *G04G 9/0064* (2013.01);
(Continued)

(58) Field of Classification Search
CPC ...... G06F 1/163; G06F 3/04883; G06F 3/017; G06F 3/0488; G06F 3/0482;
(Continued)

(56) References Cited

U.S. PATENT DOCUMENTS

2014/0181715 A1* 6/2014 Axelrod ............... G06F 3/0487
715/771
2015/0015502 A1 1/2015 Al-Nasser
(Continued)

FOREIGN PATENT DOCUMENTS

KR 1020100027867 3/2010
WO 2014171734 10/2014
(Continued)

OTHER PUBLICATIONS

PCT International Application No. PCT/KR2015/005361, Written Opinion of the International Searching Authority dated Mar. 31, 2016, 22 pages.

*Primary Examiner* — Hau H Nguyen
(74) *Attorney, Agent, or Firm* — Lee, Hong, Degerman, Kang & Waimey

(57) ABSTRACT

Disclosed in the present specification is a wearable terminal for resolving limitation of a narrow display. The wearable terminal, according to the present specification, comprises: a band to be worn on a main body and the wrist; a display unit provided on the main body; and a control unit for controlling so that the content of an event is displayed on the display unit when the event occurs, wherein the control unit can run a normal mode and a special mode depending on the situation of a user, and is capable of controlling so that the content of the event is displayed on the display unit according to the situation of the user when the event has occurred in the special mode.

20 Claims, 23 Drawing Sheets

(51) Int. Cl.
*G04G 21/02* (2010.01)
*G06F 3/14* (2006.01)
*G04G 9/00* (2006.01)
*G09G 5/14* (2006.01)
*G06F 3/0482* (2013.01)
*G06F 3/0488* (2013.01)
*G06F 3/16* (2006.01)
*G06F 3/147* (2006.01)
*G06F 3/01* (2006.01)
*G04G 21/08* (2010.01)
*A63B 24/00* (2006.01)
*G06F 1/16* (2006.01)
*G09G 5/373* (2006.01)
*H04L 12/58* (2006.01)
*H04M 5/04* (2006.01)

(52) U.S. Cl.
CPC ........... *G04G 21/025* (2013.01); *G04G 21/08* (2013.01); *G06F 1/163* (2013.01); *G06F 3/016* (2013.01); *G06F 3/0482* (2013.01); *G06F 3/04886* (2013.01); *G06F 3/14* (2013.01); *G06F 3/147* (2013.01); *G06F 3/167* (2013.01); *G09G 5/14* (2013.01); *G09G 5/373* (2013.01); *H04L 51/00* (2013.01); *H04M 5/04* (2013.01); *G09G 2340/14* (2013.01); *G09G 2340/145* (2013.01); *H04L 51/24* (2013.01); *H04M 2203/301* (2013.01)

(58) Field of Classification Search
CPC ......... G06F 2203/04808; G06F 3/0346; G06F 3/04842; G06F 3/04845; G06F 2203/04806; G06F 2221/2111; G06F 9/542; G09G 2340/0492; G09G 2340/145; G09G 2356/00; G09G 3/20; G09G 5/373
See application file for complete search history.

(56) References Cited

U.S. PATENT DOCUMENTS

| | | | | |
|---|---|---|---|---|
| 2015/0278165 | A1* | 10/2015 | Kim | G06F 17/212 715/252 |
| 2016/0041804 | A1* | 2/2016 | Wan | G06F 1/163 345/1.3 |
| 2016/0088453 | A1* | 3/2016 | Joo | H04W 4/16 455/414.1 |
| 2016/0337843 | A1* | 11/2016 | Repka | H04W 8/22 |
| 2017/0010677 | A1* | 1/2017 | Roh | G06F 3/0488 |

FOREIGN PATENT DOCUMENTS

| | | |
|---|---|---|
| WO | 2014181918 | 11/2014 |
| WO | 2015037792 | 3/2015 |

\* cited by examiner normal mode  special mode

WEARABLE TERMINAL FOR DISPLAYING SCREEN OPTIMIZED FOR VARIOUS SITUATIONS

CROSS-REFERENCE TO RELATED APPLICATIONS

This application is the National Stage filing under 35 U.S.C. 371 of International Application No. PCT/KR2015/005361, filed on May 28, 2015, the contents of which are all hereby incorporated by reference herein in its entirety.

TECHNICAL FIELD

The present invention relates to a wearable terminal that may display an optimized screen in accordance with an environment of a user or an application which is being used.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal. The mobile terminals may again be classified as wearable terminals and non-wearable terminals according to whether or not a user can wear the terminal. Also, the wearable terminals may be classified as various terminals according to a position where the terminal is worn on a body of a user. Examples of the wearable terminals include a head mounted display (HMD), a smart glass worn on a face of a user, and a smart watch worn on a wrist of a user.

Recently, a watch type wearable terminal has received attention as an independent mobile terminal beyond a smart phone accessory. However, the watch type wearable terminal fails to have a display size the same as that of a smart phone in view of its characteristic worn on a wrist of a user. Therefore, if much information is displayed on a display of the watch type wearable terminal at one time, such information is displayed at too small characters, whereby a user may feel inconvenience. Also, it is required to selectively display only information required for a user depending on a condition of the user.

DISCLOSURE

Technical Problem

An object of the present invention devised to solve the aforementioned problem of the related art is to provide a wearable terminal intended to solve a restriction on a small display.

The technical objects that can be achieved through the present invention are not limited to what has been particularly described hereinabove and other technical objects not described herein will be more clearly understood by persons skilled in the art from the following detailed description.

Technical Solution

To achieve the object of the present specification, a wearable terminal according to the present specification comprises a band configured to be worn on a main body or wrist; a display unit provided in the main body; and a controller controlling a content of an event to be displayed on the display unit when the event occurs, wherein the controller executes a normal mode and a special mode according to a situation of a user, and controls the content of the event according to the situation of the user, to be displayed on the display unit when the event occurs in the special mode.

According to one embodiment of the present specification, the controller may control the content of the event to be displayed on the display unit as a text or icon relatively greater than that of the normal mode when the event occurs in the special mode.

According to one embodiment of the present specification, the controller may control the content of the event to be displayed on the display unit by being divided into a number of times relatively more than that of the normal mode when the event occurs in the special mode.

According to one embodiment of the present specification, the controller may execute the special mode for controlling the content of the event to be displayed on the display unit as a text or icon relatively greater than that of the normal mode by using externally received weather information when the user is outdoor at a rainy or snowy weather.

According to one embodiment of the present specification, the controller may switch the special mode to the normal mode in accordance with a change of the situation of the user when the event occurs in the special mode.

According to one embodiment of the present specification, the controller may control a content of an email to be output as a voice when the email is received in the special mode.

According to one embodiment of the present specification, the controller may control the content of the event to be displayed on the display unit in accordance with an exercising amount of the user when the event occurs in the special mode. At this time, the controller may control a voice guide indicating that the user does not receive a call, to be output when an exercising amount of the user is close to a target value. Also, the controller may control a voice guide for guiding whether to answer to the received message and a voice input for an answering message, to be output when an exercising amount of the user is close to a target value. Meanwhile, the controller may control a voice guide, which answers to the received message after an exercise amount of the user reaches a target exercise amount, when the exercise amount of the user is close to a target value.

According to one embodiment of the present specification, when an event due to a call or message from a preset sender occurs, the controller may control a guide screen for checking whether the user receives the event, to be displayed on the display unit. At this time, the controller may control an answer related to a content of the received message, to be transmitted. Also, the controller may control an application program related to the content of the received message, to be executed.

According to one embodiment of the present specification, when an event due to a call or message from an unregistered sender occurs, the controller may control a guide screen for guiding the user to check reception rejection, to be displayed on the display unit. At this time, when the special mode ends, the controller may control a guide screen for the event of which reception is rejected, to be displayed on the display unit.

To achieve the object of the present specification, a wearable terminal according to the present specification comprises a band configured to be worn on a main body or wrist; a display unit provided in the main body; and a controller executing at least one application program, wherein the controller controls a screen for guiding a user whether to execute an operation corresponding to the application program, to be displayed on the display unit when a user input is received while the application program is being executed.

According to one embodiment of the present specification, when a user input is received while an application program for displaying a missed call or received message is being executed, the controller may control a screen for guiding the user whether to execute an operation corresponding to the missed call or received message, to be displayed on the display unit.

According to one embodiment of the present specification, when a user input is received while an application program for displaying an event occurring in the wearable terminal is being executed, the controller may control a screen for guiding the user whether to execute an operation corresponding to the event, to be displayed on the display unit.

According to one embodiment of the present specification, when a user input is received while a mail related application program is being executed, the controller may control a screen for guiding the user whether to execute an operation corresponding to a mail displayed by the mail related application program, to be displayed on the display unit.

According to one embodiment of the present specification, when a user input is received while a multimedia play related application program is being executed, the controller may control a screen for guiding the user whether to execute an operation corresponding to a screen displayed by the multimedia related application program, to be displayed on the display unit.

According to one embodiment of the present specification, when a user input is received while a call related application program is being executed, the controller may control a screen for guiding the user whether to execute an operation corresponding to a screen displayed by the call related application program, to be displayed on the display unit.

Advantageous Effects

According to one aspect of the present specification, a restriction on a small display of a wearable terminal may be solved.

According to another aspect of the present specification, a guide screen suitable for a status of a user may be provided.

According other aspect of the present specification, a guide screen corresponding an application which is being used by a user may be provided, whereby the user may control the terminal through a simple voice command.

BRIEF DESCRIPTION OF THE DRAWINGS

The accompanying drawings, which are included to provide a further understanding of the present specification, illustrate preferred embodiments of the present specification and together with the description serve to explain the technical spirits of the present specification, and thus the present specification should not be construed to be limited to the drawings.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the following description, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Figure 1:
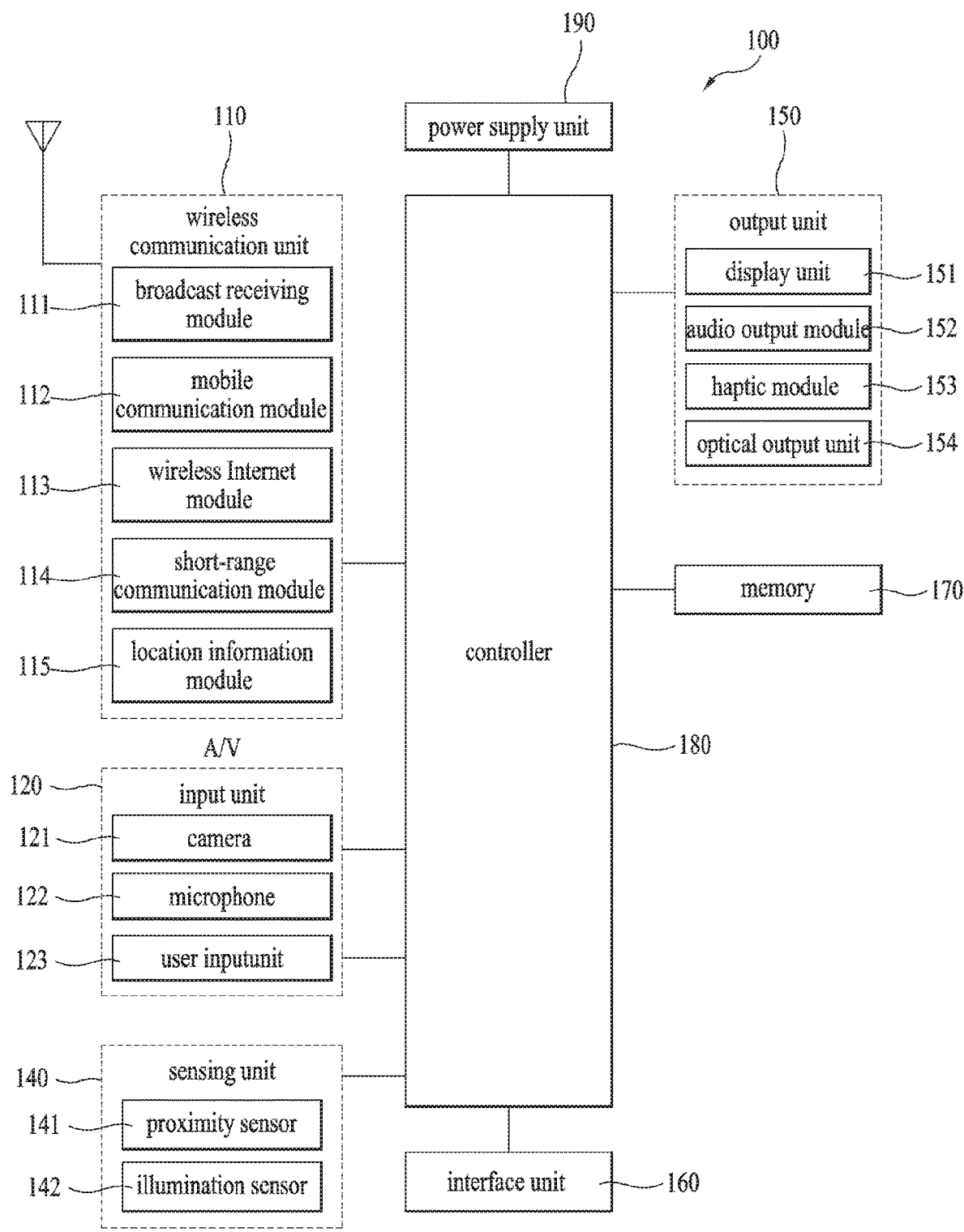
FIG. 1 is a block diagram briefly illustrating a wearable terminal according to the present specification.

FIG. 1 is a block diagram briefly illustrating a wearable terminal according to the present specification.

Referring to FIG. 1, the wearable terminal 100 may include a wireless communication unit 110, an input unit 120, a sensing unit 140, an output unit 150, an interface unit 160, a memory 170, a controller 180, and a power supply unit 190. It is understood that components illustrated in FIG. 1 are not essentially required to implement the wearable terminal, and that greater or fewer components may alternatively be implemented.

In more detail, the wireless communication unit 110 may include one or more modules which permit communications such as wireless communications between the wearable terminal 100 and a wireless communication system, communications between the wearable terminal 100 and another wearable terminal 100, or communications between the wearable terminal 100 and an external server. Further, the wireless communication unit 110 may include one or more modules which connect the wearable terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or video input unit for video signal input, a microphone 122 or audio input unit for audio signal input, and a user input unit 123 (for example, a touch key, a push key, a mechanical key, and the like) for allowing a user to input information. Audio data or image data obtained by the input unit 120 may be analyzed and processed by a control command of a user.

The sensing unit 140 may include one or more sensors configured to sense at least one of internal information of the wearable terminal, surrounding environment information of the wearable terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, etc.), and a chemical sensor (for example, an electronic nose, a health care sensor, a biometric sensor, and the like). Meanwhile, the wearable terminal disclosed in this specification may be configured to utilize information sensed from at least two or more of the sensors in combination.

The output unit 150 is configured to output various types of outputs related to audio, video, tactile output, and the like. The output unit 150 may include at least one of a display unit 151, an audio output module 152, a haptic module 153, and an optical output unit 154. The display unit 151 may have an inter-layered structure or an integrated structure with a touch sensor in order to facilitate a touch screen. The touch screen may provide an output interface between the wearable terminal 100 and a user, as well as function as the user input unit 123 which provides an input interface between the wearable terminal 100 and the user.

The interface unit 160 serves as an interface with various types of external devices that can be coupled to the wearable terminal 100. The interface unit 160, for example, may include at least one of wired or wireless headset ports, external power supply ports, wired or wireless data ports, memory card ports, ports for connecting a device having an identification module, audio input/output (I/O) ports, video I/O ports, and earphone ports. In some cases, the wearable terminal 100 may perform assorted control functions associated with a connected external device, in response to the external device being connected to the interface unit 160.

Also, the memory 170 stores data to support various functions of the wearable terminal 100. The memory 170 may be configured to store a plurality of application programs or applications executed in the wearable terminal 100 and data or instructions for operations of the wearable terminal 100. Some of these application programs may be downloaded from an external server via wireless communication. Also, at least some of the application programs may be installed within the wearable terminal 100 at time of manufacturing or shipping, which is the case for basic functions of the wearable terminal 100 (for example, receiving a call, placing a call, receiving a message, sending a message, and the like). It is common for application programs to be stored in the memory 170, installed in the wearable terminal 100, and executed by the controller 180 to perform an operation (or function) for the wearable terminal 100.

The controller 180 typically functions to control overall operation of the wearable terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control some or all of the components illustrated in FIG. 1 to execute the application programs stored in the memory 170. Moreover, the controller 180 may execute at least two or more of the components included in the wearable terminal 100 in combination to execute the application programs.

The power supply unit 190 is configured to receive external power or internal power in order to supply appropriate power required for operating elements and components included in the wearable terminal 100 under the control of the controller 180. The power supply unit 190 may include a battery, and the battery may be configured as an embedded type battery or an exchangeable type battery.

Some or more of the components may be operated cooperatively to embody an operation, control or a control method of the wearable terminal in accordance with various embodiments which will be described hereinafter. Also, the operation, control or control method of the wearable terminal may be realized on the wearable terminal by driving of one or more application problems stored in the memory 170.

The mobile communication module 112 transmits and/or receives wireless signals to and from at least one of a base station, an external mobile terminal, and a server on a mobile communication network constructed in accordance with technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of the wireless signals may include audio call signals, video call signals, or various formats of data to support communication of text and multimedia messages.

The wireless Internet module 113 means a module for wireless Internet access. This module may be internally or externally coupled to the wearable terminal 100. The wireless Internet module 113 is configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, the wireless Internet module 113 performs such wireless Internet access through the mobile communication network. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 may support wireless communications between the wearable terminal 100 and a wireless communication system, communications between the wearable terminal 100 and another wearable terminal 100, or communications between the mobile terminal and a network where another wearable terminal 100 (or an external server) is located, via wireless area networks. One example of the wireless area networks may be wireless personal area networks.

In this case, another mobile terminal may be a wearable terminal (for example, a smart watch, a smart glasses or a head mounted display (HMD)), which is able to exchange data with the wearable terminal 100 according to the present invention. The short-range communication module 114 may sense (or recognize) the wearable terminal, which is capable of performing communication with the wearable terminal 100, in the periphery of the wearable terminal 100. Moreover, when the sensed wearable terminal is a terminal which is authenticated to communicate with the wearable terminal 100 according to the present invention, the controller 180, for example, may cause transmission of data processed in the wearable terminal 100 to another wearable terminal via the short-range communication module 114. Therefore, a user of another wearable terminal may use the data processed in the wearable terminal 100 through another wearable terminal. For example, when a call is received in the wearable terminal 100, the user may answer the call using another wearable terminal. Also, when a message is received in the wearable terminal 100, the user can check the received message using another wearable terminal.

The location information module 115 is a module for acquiring a position (or current position) of the wearable terminal. As an example, the location information module 115 includes a Global Position System (GPS) module or a Wi-Fi module. As one example, when the wearable terminal uses a GPS module, a position of the wearable terminal may be acquired using a signal sent from a GPS satellite. As another example, when the wearable terminal uses the Wi-Fi module, a position of the wearable terminal can be acquired based on information related to a wireless access point (AP) which transmits or receives a wireless signal to or from the Wi-Fi module. If desired, the location information module 115 may alternatively or additionally function as any of the other modules of the wireless communication unit 110 to obtain data related to the position of the wearable terminal. The location information module 115 is a module used to acquire the position (or current position) of the wearable terminal, and is not limited to a module that directly calculates or acquires the position of the wearable terminal.

Next, the input unit 120 may be configured for input of video information (or signal), audio information (or signal), data, or information input from a user. For input of video information, the wearable terminal 100 may include one or a plurality of cameras 121. Such cameras 121 may process image frames of still pictures or moving video obtained by image sensors in a video call mode or image capture mode. The processed image frames can be displayed on the display unit 151 or stored in the memory 170. Meanwhile, the plurality of cameras 121 provided in the wearable terminal 100 may be arranged in a matrix configuration to permit a plurality of images having various angles or focal points to be input to the wearable terminal 100. Also, the plurality of cameras 121 may be located in a stereoscopic arrangement to acquire left and right images for implementing a stereoscopic image.

The microphone 122 processes an external audio signal to electric audio data. The processed audio data may be used in various manners according to a function (or application program) being executed in the wearable terminal 100. Meanwhile, the microphone 122 may include various noise removing algorithms to remove unwanted noise generated in the course of receiving the external audio signal.

The user input unit 123 is a component that permits input by a user. If information is input through the user input unit 123, the controller 180 may control the operation of the wearable terminal 100 to correspond to the input information. The user input unit 123 may include a mechanical input means (or a mechanical key, for example, a button located on a front and/or rear surface or a side surface of the wearable terminal 100, a dome switch, a jog wheel, a jog switch, and the like) and a touch-sensitive input means. As one example, the touch-sensitive input means may be a virtual key, a soft key or a visual key, which is displayed on a touch screen through software processing, or a touch key which is arranged on a location other than the touch screen. On the other hand, the virtual key or the visual key may be displayed on the touch screen in various shapes, for example, graphic, text, icon, video, or a combination thereof.

Meanwhile, the sensing unit 140 is configured to sense at least one of internal information of the wearable terminal, surrounding environment information of the wearable terminal, and user information, and generate a sensing signal corresponding to the sensed information. The controller 180 may control driving or operation of the wearable terminal 100 or perform a data processing, function or operation related to the application program installed in the wearable terminal 100, based on the sensing signal. Representative sensors of the various sensors that may be included in the sensing unit 140 will be described in more detail.

First of all, the proximity sensor 141 means a sensor that senses the presence or absence of an object approaching a predetermined detection surface or an object located near the surface, by using an electromagnetic field, infrared rays, or the like without a mechanical contact. The proximity sensor 141 may be arranged at an inner region of the wearable terminal covered by the touch screen, or near the touch screen.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may be configured to sense proximity of the object by changes of an electromagnetic field, which is responsive to an approach of an object with conductivity. In this case, the touch screen (or touch sensor) may also be categorized as a proximity sensor.

Meanwhile, for convenience of description, the term "proximity touch" will be referred to herein to denote the scenario in which an object is positioned to be proximate to the touch screen without contacting the touch screen and recognized to be positioned on the touch screen. The term "contact touch" will be referred to herein to denote the scenario in which an object makes physical contact with the touch screen. For the position corresponding to the proximity touch of the object on the touch screen, such position will correspond to a position where the object is perpendicular to the touch screen when the object corresponds to the proximity touch. The proximity sensor 141 may sense a proximity touch, and proximity touch patterns (for example, proximity touch distance, proximity touch direction, proximity touch speed, proximity touch time, proximity touch position, proximity touch moving status, and the like). Meanwhile, the controller 180 processes data (or information) corresponding to the proximity touch operation and proximity touch patterns sensed by the proximity sensor 141, and causes output of visual information corresponding to the processed data on the touch screen. In addition, the controller 180 can control the wearable terminal 100 to execute different operations or process different data (or information) according to whether a touch with respect to a point on the touch screen is either a proximity touch or a contact touch.

A touch sensor senses a touch (or touch input) applied to the touch screen (or display unit 151) by using at least one of a variety of touch methods such as a resistive type, a capacitance type, an infrared type, an ultrasonic type, and a magnetic field type.

As one example, the touch sensor may be configured to convert changes of pressure applied to a specific part of the touch screen or capacitance occurring at the specific part of the touch screen into electric input signals. The touch sensor may also be configured to sense a touched position of a touch object, which applies a touch to the touch screen, a touched area of the touch object, a touch pressure and/or touch capacitance. In this case, the touch object is generally used to apply a touch input to the touch sensor. Examples of the touch object include a finger, a touch pen, a stylus pen, a pointer, or the like.

In this way, when the touch input is sensed by the touch sensor, corresponding signal(s) is(are) transmitted to a touch controller. The touch controller processes the received qjsignal(s), and then transmits corresponding data to the controller 180. Accordingly, the controller 180 may identify which region of the display unit 151 has been touched. In this case, the touch controller may be a component separate from the controller 180, or may be the controller 180.

Meanwhile, the controller 180 may execute the same or different controls according to a type of a touch object that touches the touch screen (or a touch key provided in addition to the touch screen). Whether to execute the same or different controls according to the type of the touch object may be decided based on a current operating state of the wearable terminal 100 or a currently executed application program.

Meanwhile, the touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swype touch, and a hovering touch.

The ultrasonic sensor may be implemented to recognize position information related to a sensing object by using ultrasonic waves. Meanwhile, the controller 180 may calculate a position of a wave generation source based on information sensed by the optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. In more detail, the position of the wave generation source may be calculated using the time difference from the time that the ultrasonic wave reaches the sensor based on the light as a reference signal.

Meanwhile, the camera 121 which is the component of the input unit 120 includes at least one of a camera sensor (e.g., CCD, CMOS, etc.), a photo sensor (or image sensors), and a laser sensor.

The camera 121 and the laser sensor may sense a touch of a sensing target for a 3D stereoscopic image in combination. The photo sensor may be laminated on the display device. The photo sensor is configured to scan movement of the sensing target in proximity to the touch screen. In more detail, the photo sensor may package photo diodes and transistors (TRs) at rows and columns to scan contents arranged on the photo sensor using an electric signal which changes according to the quantity of light to the photo diodes. Namely, the photo sensor may calculate the coordinates of the sensing target according to variation of light to thus obtain position information of the sensing target.

The display unit 151 displays (outputs) information processed in the wearable terminal 100. For example, the display unit 151 may display execution screen information of an application program executed in the wearable terminal 100 or user interface (UI) and graphic user interface (GUI) information based on the execution screen information.

Also, the display unit 151 may be configured as a stereoscopic display unit for displaying stereoscopic images.

The stereoscopic display unit may employ a 3D display scheme such as a stereoscopic display scheme (glasses scheme), an auto-stereoscopic scheme (glasses-free scheme), and a projection scheme (holographic scheme).

The audio output module 152 may output audio data received from the wireless communication unit 110 or stored in the memory 170 during a call signal reception mode, a call mode, a record mode, a voice recognition mode, or a broadcast reception mode. The audio output module 152 may output an audio signal related to a particular function (e.g., a call signal reception sound, a message reception sound, etc.) performed by the wearable terminal 100. The audio output module 152 may include a receiver, a speaker, a buzzer, or the like.

The haptic module 153 generates various tactile effects that a user may feel, perceive, or otherwise experience. A typical example of a tactile effect generated by the haptic module 153 may be vibration. The strength, pattern and the like of the vibration generated by the haptic module 153 may be controlled by user selection or setup of the controller. For example, the haptic module 153 may output different vibrations in a combining manner or a sequential manner.

Besides vibration, the haptic module 153 may generate various other tactile effects, including an effect by stimulation such as a pin arrangement vertically moving to a contact skin, a spray force or suction force of the air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the wearable terminal 100.

The optical output module 154 outputs a signal for indicating occurrence of an event using light of a light source. Examples of the event generated in the wearable terminal 100 may include message reception, call signal reception, a missed call, an alarm, a schedule notice, an email reception, and information reception through an application.

A signal output by the optical output module 154 may be implemented in such a manner that the wearable terminal emits monochromatic light or light with a plurality of colors to a front or rear surface. The signal output may be terminated as the wearable terminal senses that a user has checked the generated event.

The interface unit 160 serves as an interface for all external devices to be connected with the wearable terminal 100. The interface unit 160 may receive data or power transmitted or supplied from an external device to transfer the received data or power to elements and components within the wearable terminal 100, or transmit internal data of the wearable terminal 100 to such external device. For example, the interface unit 160 may include wired or wireless headset ports, external power supply ports, wired or wireless data ports, memory card ports, ports for connecting a device having an identification module, audio input/output (I/O) ports, video I/O ports, and earphone ports.

Meanwhile, the identification module may be a chip that stores various kinds of information for authenticating the authority of using the wearable terminal 100 and may include a user identity module (UIM), a subscriber identity module (SIM), a universal subscriber identity module (USIM), and the like. In addition, the device having the identification module (also, referred to as an "identifying device") may be manufactured in the form of a smart card. Accordingly, the identifying device can be connected with the terminal 100 via the interface unit 160.

Also, when the wearable terminal 100 is connected with an external cradle, the interface unit 160 may serve as a passage to allow the power from the cradle to be supplied to the wearable terminal 100 or may serve as a passage to allow various command signals input by the user from the cradle to be transferred to the wearable terminal 100. The various command signals or power input from the cradle may operate as signals for recognizing that the wearable terminal 100 is accurately mounted on the cradle.

The memory 170 may store programs to support operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one or more types of storage mediums including a Flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The wearable terminal 100 may be operated in relation to a web storage device that performs the storage function of the memory 170 over a network, such as the Internet.

Meanwhile, as described above, the controller 180 typically controls the operation related to the application program and the overall operations of the wearable terminal 100. For example, the controller 180 may set or release a lock state for restricting a user from inputting a control command with respect to applications when a status of the wearable terminal meets a preset condition.

Also, the controller 180 may perform the controlling and processing associated with voice calls, data communications, video calls, and the like, or perform pattern recognition processing to recognize a handwriting input or a picture drawing input performed on the touch screen as texts or images, respectively. In addition, the controller 180 may control one or a combination of the above-described components in order to implement various exemplary embodiments disclosed herein on the wearable terminal 100 according to the present invention.

The power supply unit 190 receives external power or internal power under the control of the controller 180 and supply the appropriate power required for operating the respective elements and components included in the wearable terminal 100. The power supply unit 190 may include a battery, which is typically rechargeable or may be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this case, the power supply unit 190 may receive power, which is transferred from an external wireless power transmitter, using at least one of an inductive coupling method based on magnetic induction or a magnetic resonance coupling method based on electromagnetic resonance.

Meanwhile, various embodiments described herein may be implemented in a computer-readable medium, or similar medium using, for example, software, hardware, or any combination thereof.

Figure 2:
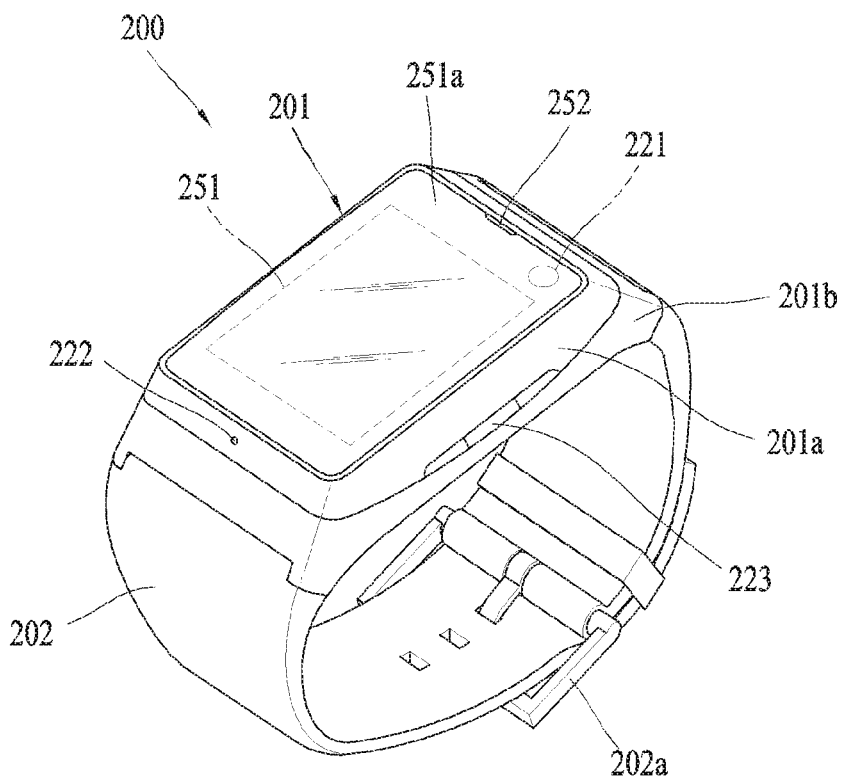
FIG. 2 is a perspective view illustrating a watch type wearable terminal according to one embodiment of the present invention.

FIG. 2 is a perspective view illustrating one embodiment of a watch type wearable terminal according to one embodiment of the present invention.

Referring to FIG. 2, a watch-type wearable terminal 200 includes a main body 201 including a display unit 251, and a band 202 configured to be worn on a wrist in a manner of being connected to the main body 201.

The main body 201 may include a case having an external appearance. As illustrated, the case may include a first case 201*a* and a second case 201*b* cooperatively defining an inner space for accommodating various electronic components. However, the present invention is not limited to this configuration, and for example, a single case may be configured to define the inner space, whereby the wearable terminal 200 with a uni-body may be implemented.

The watch type mobile terminal 200 may be configured to perform wireless communication, and an antenna for the wireless communication may be installed in the main body 201. The antenna may extend its function using the case. For example, a case including a conductive material may be electrically connected to the antenna to extend a ground area or a radiation area.

The display unit 251 may be arranged at the front side of the main body 201 so that information may be output. The display unit 251 may include a touch sensor so that the display unit may function as a touch screen. As illustrated, a window 251*a* of the display unit 251 may be positioned on the first case 201*a* to form a front surface of the terminal body together with the first case 201*a*.

Meanwhile, although FIG. 2 illustrates that the display unit 251 has a rectangular shape, the display unit 251 may have a circular shape. At this time, the case may also have various shapes corresponding to the shapes of the display unit 251.

The main body 201 may include an audio output module 252, a camera 221, a microphone 222, and a user input unit 223. When the display unit 251 is implemented as a touch screen, the display unit 251 may function as a user input unit 223, whereby a separate key may not be included in the main body 201.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

Meanwhile, the band 202 may be used for extending the performance of the antenna. For example, the band may include a ground extending portion (not shown) therein electrically connected to the antenna to extend a ground area.

The band 202 may include fastener 202*a*. The fastener 202*a* may be implemented into a buckle type, a snap-fit hook structure, a Velcro™ type, or the like, and may include a flexible section or material. The drawing illustrates an example that the fastener 202*a* is implemented using a buckle.

The wearable terminal 200 may be configured to mutually exchange (or interwork) data with another mobile terminal. The short-range communication module 114 may sense (or recognize) the mobile terminal, which may perform communication, near the wearable terminal 200. Moreover, the controller 180 may transmit at least a part of data processed by the wearable terminal 200 to the mobile terminal through the short-range communication module 114 when the sensed mobile terminal is a terminal authenticated to perform communication with the wearable terminal 200. On the contrary, the controller 180 may receive at least a part of data processed by the mobile terminal from the mobile terminal through the short-range communication module 114. Therefore, the user may use the wearable terminal 200 through the data processed by the mobile terminal. For example, the user may perform call communication through the wearable terminal 200 when a call is received in the mobile terminal, or may check a message through the wearable terminal 200 when the message is received in the mobile terminal.

The wearable terminal 200 according to the present invention may check the situation of the user. The situation of the user means a status of the user, a surrounding environment of the user, or the like.

According to one embodiment of the present invention, the wearable terminal 200 may check the situation of the user through the sensing unit 140.

The sensing unit 140 may sense a motion of the user, changes of body information of the user, noise of the surrounding environment, intensity of light, etc. The controller 180 may check the situation of the user by processing the information obtained through the sensing unit 140. For example, the controller 180 may check whether the user is exercising, driving, in a meeting, or moving. Moreover, the controller 180 may check a detailed situation, such as walking, running, vehicle moving, and usage of public transportation, when the user is moving. Since detailed methods for checking the situation of the user through the controller 180 are disclosed in the US Patent Publication Nos. US 2012/0035931 A1 and US 2014/0181715 A1, their detailed description will be omitted.

According to another embodiment of the present invention, the wearable terminal 200 may check the situation of the user through a user input. In this case, the controller 180 may check whether the user is exercising, driving, in a meeting, or moving, in accordance with information directly input by the user.

The wearable terminal 200 according to the present specification may execute a normal mode and a special mode according to the situation of the user.

The normal mode is a mode executed by the controller 180 in the event that the user is relatively less restricted in checking the display unit 151. For example, the user is not restricted in checking information of a sender, which is displayed on the display unit 151, when a call is received in the event that the user sits down while viewing a TV at home. In this case, the controller 180 executes the normal mode and may display the content of the event as usual setup.

The special mode is a mode executed by the controller 180 in the event that the user is relatively more restricted in checking the display unit 151. For example, the user may have a difficulty in checking information of a sender, which is displayed on the display unit 151, when a call is received in a state the user is running in the street. In this case, the controller 180 executes the special mode, and may display the content of the event on the display unit 151 differently from the usual setup. In other words, the special mode is a display mode optimized for the situation of the user to allow the user to easily view the content of the event. The controller 180 may execute the special mode when the user is walking, driving, exercising, or in a meeting.

According to one embodiment of the present invention, the controller 180 may control the display unit 151 to display the content of the event as text or icon relatively greater than that of the normal mode when the event occurs in the special mode.

Figure 3:
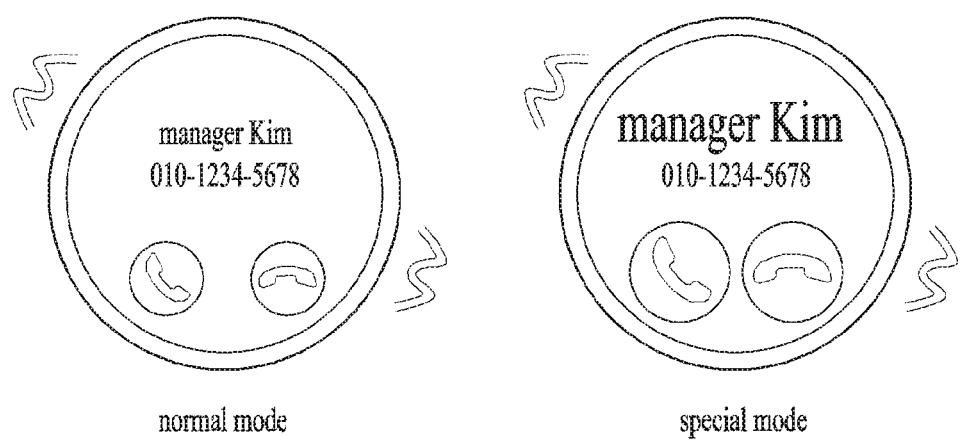
FIG. 3 illustrates an embodiment that sender information is displayed on a display unit in accordance with a normal mode and a special mode.

FIG. 3 illustrates an embodiment that sender information is displayed on a display unit in accordance with a normal mode and a special mode.

Referring to FIG. 3, the user may check that sender information is displayed on the display unit 151. In comparison between the normal mode and the special mode, it is noted that a size of text and icon displayed on the display unit 151 in the special mode is greater than that in the normal mode. When a call is received while the user is walking, the time when the user can view the text and icon displayed on the display unit 151 is shorter than usual due to vibration of an arm caused by walking. Therefore, the controller 180 may display the text or icon relatively greater than that of the normal mode by executing the special mode while the user is walking. As a result, the user who is walking may check sender information more conveniently.

According to another embodiment of the present invention, when an event occurs in the special mode, the controller 180 may control the content of the event to be displayed on the display unit 151 by being divided into the number of times relatively more than that of the normal mode.

Figure 4:
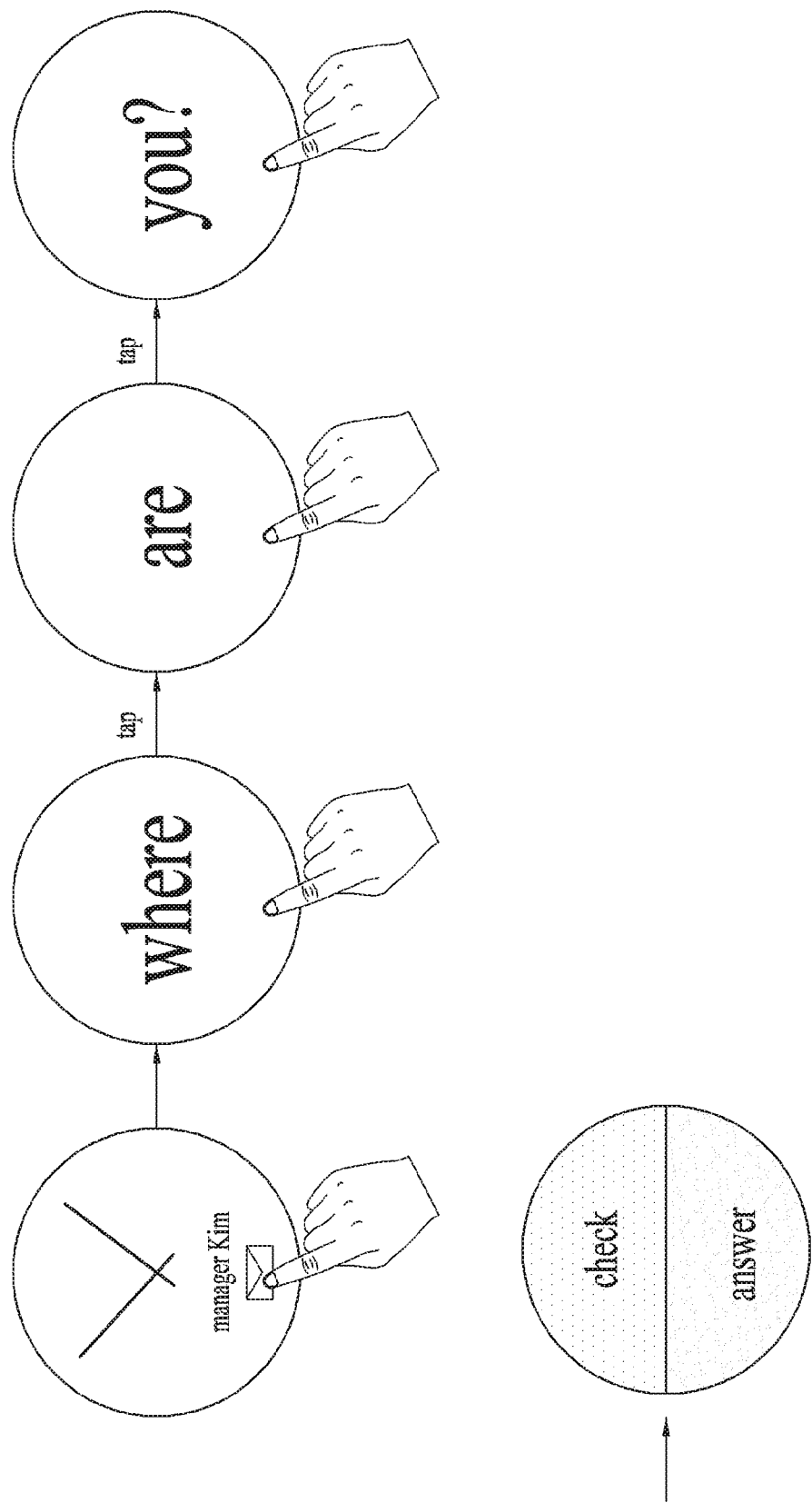
FIG. 4 illustrates an embodiment that message information is displayed on a display unit in accordance with a special mode.

FIG. 4 illustrates an embodiment that message information is displayed on a display unit in accordance with a special mode.

Referring to FIG. 4, it is noted that a content of a message is displayed on the display unit 151. The controller 180 may display the content of the message on the display unit 151 at a text of a relatively great size when an input for checking the content of the message is received from the user. In this case, the content of the message cannot be displayed on the display unit 151 at one time due to text of a great size. Therefore, the controller 180 may display the content of the event on the display unit in the special mode by dividing the content of the event into the number of times relatively more than that of the normal mode. The controller 180 may control the display unit 151 such that a screen may be switched to a content of next message by means of a touch input of the user.

Meanwhile, according to one embodiment of the present invention, the controller 180 may execute the special mode for controlling the display unit 151 to display the content of the event on the display unit as the text or icon relatively greater than that of the normal mode by using externally received weather information when the user is outdoor at a rainy or snowy weather.

The wearable terminal 200 according to the present invention may receive weather information from a server, another mobile terminal, or another wearable terminal through the wireless communication unit 110. The controller 180 may determine information as to whether a current weather corresponds to a rainy weather or snowy weather by using the received weather information. Also, the wearable terminal 200 according to the present invention may determine whether the user is outdoor or in a building with a roof, through the location information module 115. Generally, a signal transmitted from GPS satellite is not received well in a place with a roof such as building. Therefore, the controller 180 may determine that the place where the GPS signal is received is an outdoor place with no roof. Meanwhile, since the controller 180 may check an exact location of the user through the location information module 115, the controller 180 may determine that the place where the GPS signal is received is a place with a roof or not.

It is assumed that the user is outdoor when it is rainy. Since the user generally holds an umbrella, the user is restricted to check the display unit 151. Therefore, the controller 180 may execute the special mode for displaying the content of the event as text or icon relatively greater than that of the normal mode by using externally received weather information when the user is outdoor at a rainy or snowy weather.

According to one embodiment of the present specification, the controller 180 may switch the special mode to the normal mode in accordance with the change of the situation of the user when the event occurs in the special mode.

Figure 5:
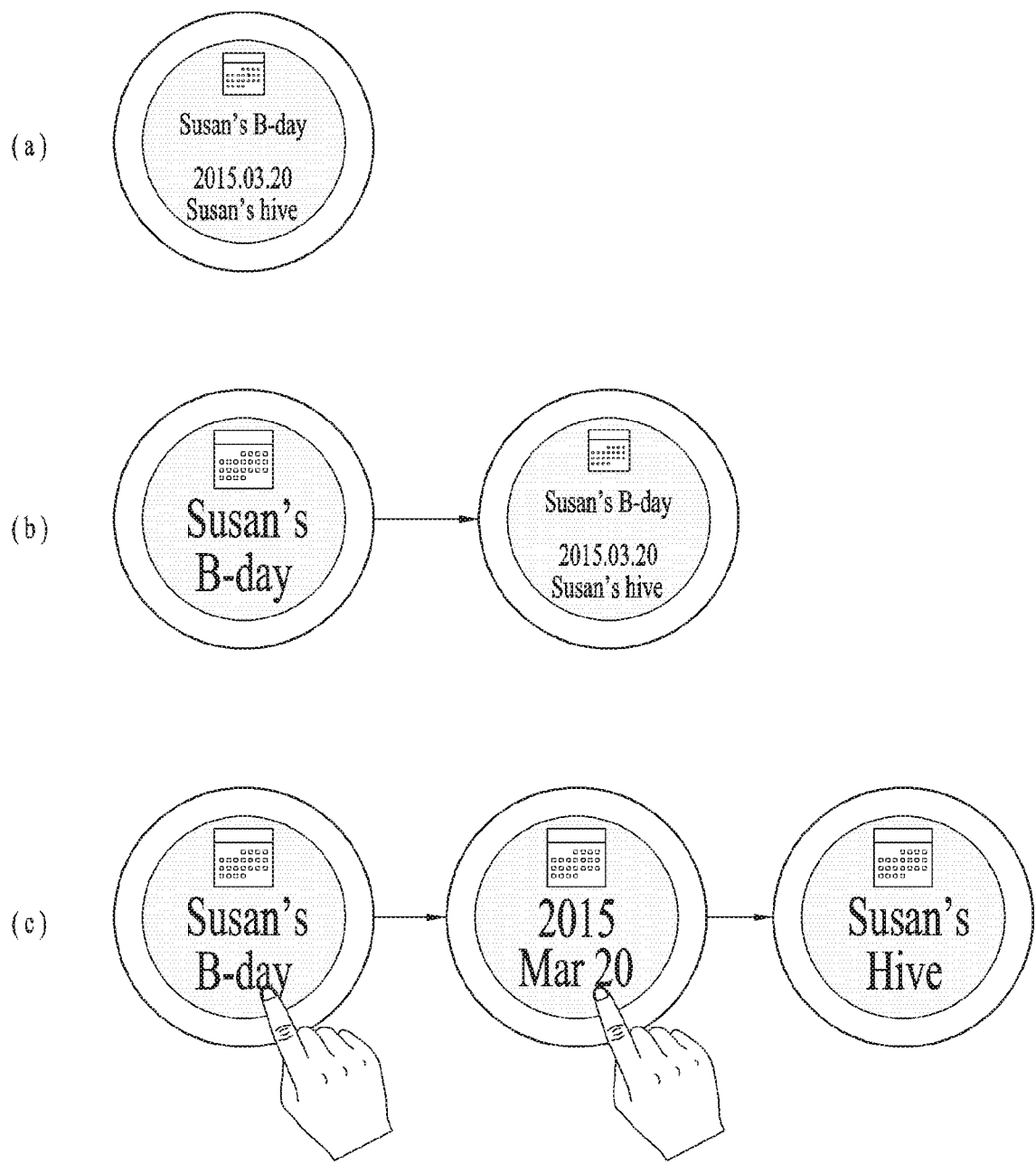
FIG. 5 illustrates an embodiment that schedule notification is displayed when a user is exercising.

FIG. 5 illustrates an embodiment that schedule notification is displayed when a user is exercising.

FIG. 5(*a*) illustrates an example that the controller 180 controls the display unit 151 to display a content of a schedule previously stored in the normal mode on the display unit 151. Referring to FIG. 5(*a*), it is noted that title, date, and place of a schedule are all displayed on one screen.

FIGS. 5(*b*) and 5(*c*) are examples that the controller 180 controls the display unit 151 to display a content of a schedule previously stored in the special mode on the display unit 151. FIGS. 5(*b*) and 5(*c*) are different from each other in that a displayed content is different depending on a reaction of the user when the content of the schedule is displayed on the display unit 151.

In FIGS. 5(*b*) and 5(*c*), it is assumed that the user is exercising. Since the user is exercising, the controller 180 may execute the special mode and control the display unit 151 to display a title of the content of the previously stored schedule on the display unit 151 as text relatively greater than that of the normal mode. At this time, the user may desire to check the schedule in detail by temporarily stopping exercise or lowering a tempo after viewing the title of the schedule. Therefore, as shown in FIG. 5(*b*), the controller 180 may control the screen displayed in the special mode to be switched to the screen displayed in the normal mode. In this case, as shown in FIG. 5(*c*), the controller 180 may the display unit to display title, date and place of the schedule in due order by receiving a touch input of the user.

According to one embodiment of the present specification, when an email is received in the special mode, the controller 180 may control a message of the email to be output as voice.

Figure 6:
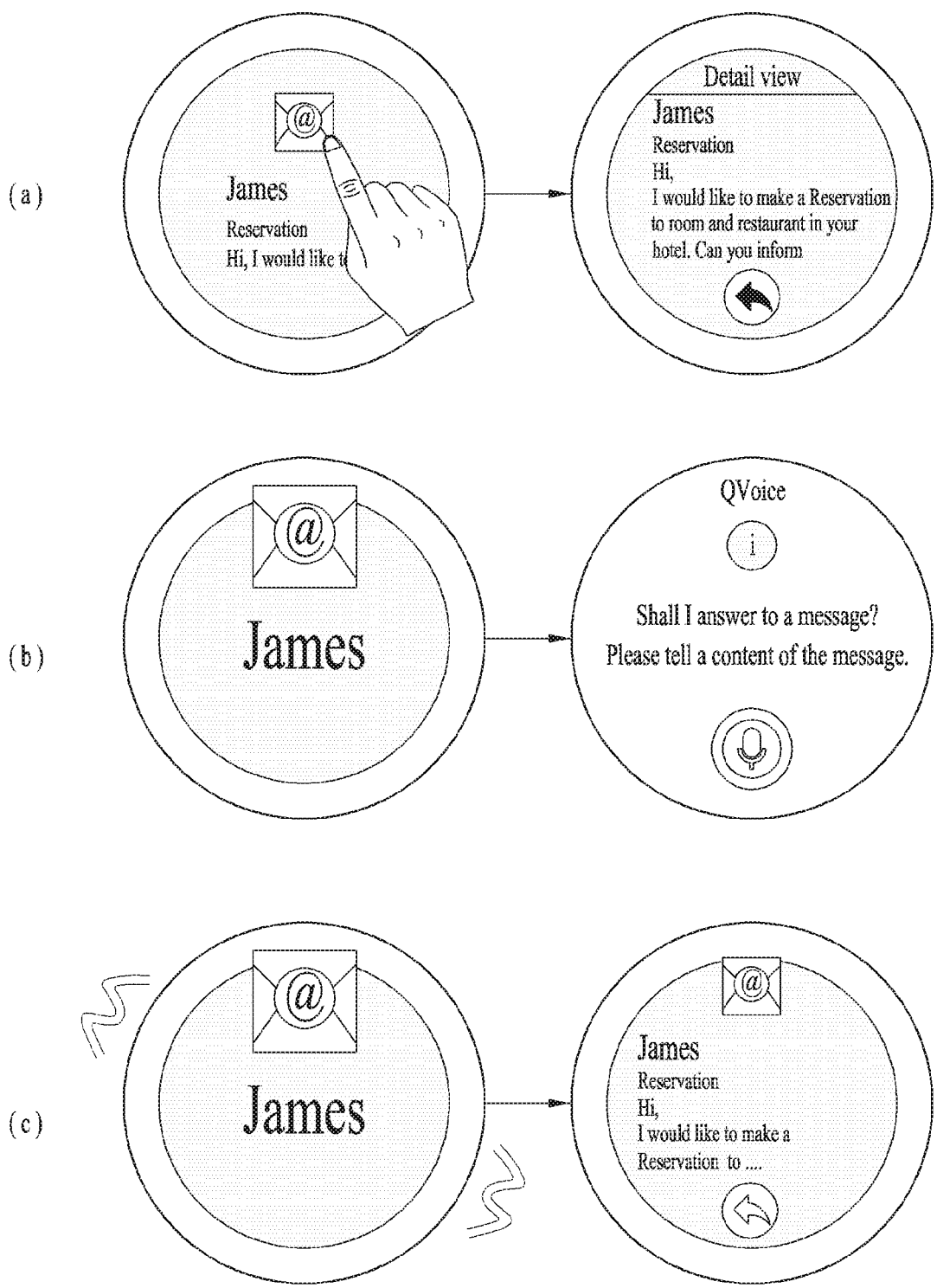
FIG. 6 illustrates an embodiment that an email message is displayed when an email is received.

FIG. 6 illustrates an embodiment that an email message is displayed when an email is received.

FIG. 6(*a*) illustrates an example that the controller 180 controls the display unit 151 to display a message of a received email on the display unit 151 in the normal mode. The controller may control the display unit 151 to display a screen notifying that the email is received on the display unit 151. The controller 180 may control the display unit 151 to display the message of the email on the display unit 151 by a touch input of the user.

FIGS. 6(*b*) and 6(*c*) are examples that the controller 180 controls the display unit 151 to display a content notifying that the email is received on the display unit 151 in the special mode. In FIGS. 6(*b*) and 6(*c*), the controller 180 may use icon and text relatively greater than those of the normal mode to notify that the email is received, in the special mode. At this time, the controller 180 may display the content together with some content of the email. Some content may be name of a sender, title, etc.

Meanwhile, it is general that the email has contents more than a message. Therefore, in the same manner as the embodiment shown in FIG. 4, if the message of the email is displayed by being divided into several icons, inconvenience may be caused for the user. Therefore, as shown in FIG. 6(*b*), if the email is received, the controller 180 may output the message of the email as voice. Also, the controller 180 may output a guide voice and a guide screen to receive an answer to the message as voice after outputting the message of the email as voice.

Meanwhile, the output of the message of the email as voice in the special mode may be contrary to intention of the user. That is, the output of voice may be varied depending on whether the third party exists near the user. The status of FIG. 6(*b*) corresponds to the case that there is no third party near the user, and the status of FIG. 6(*c*) corresponds to the case that there is a third party near the user. If there is a third part near the user, the controller 180 notifies that the email is received, through vibration, and does not output the message of the email as voice. Afterwards, the controller 180 may receive a separate input from the user, or may output the message of the email as voice through a microphone when it is checked that there is no third party near the user. Also, in case of the user who drives a car, the controller 180 may output the message of the email as voice when a car is stopped for safety or the user gets out of the car.

According to another embodiment of the present specification, the controller 180 may control the display unit 151 to display the message of the email on the display unit 151 as text relatively greater than that of the normal mode.

Figure 7:
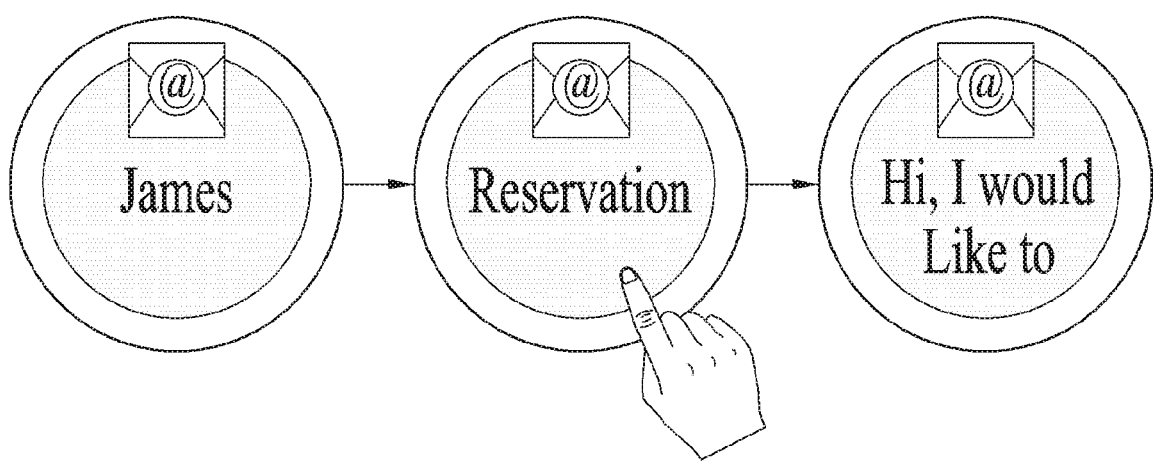
FIG. 7 illustrates an embodiment that an email message is displayed on a display unit as a great text.

FIG. 7 illustrates an embodiment that an email message is displayed on a display unit as a great text.

As shown in FIG. 7, the controller 180 may control the display unit to display the message of the email as a text of a great size. At this time, considering that the message of the email is more than a general message, the message of the email may be output per two lines on one screen.

According to one embodiment of the present specification, when an event occurs in the special mode, the controller 180 may control the display unit 151 to display a content of the event on the display unit 151 in accordance with the exercise amount of the user.

Figure 8:
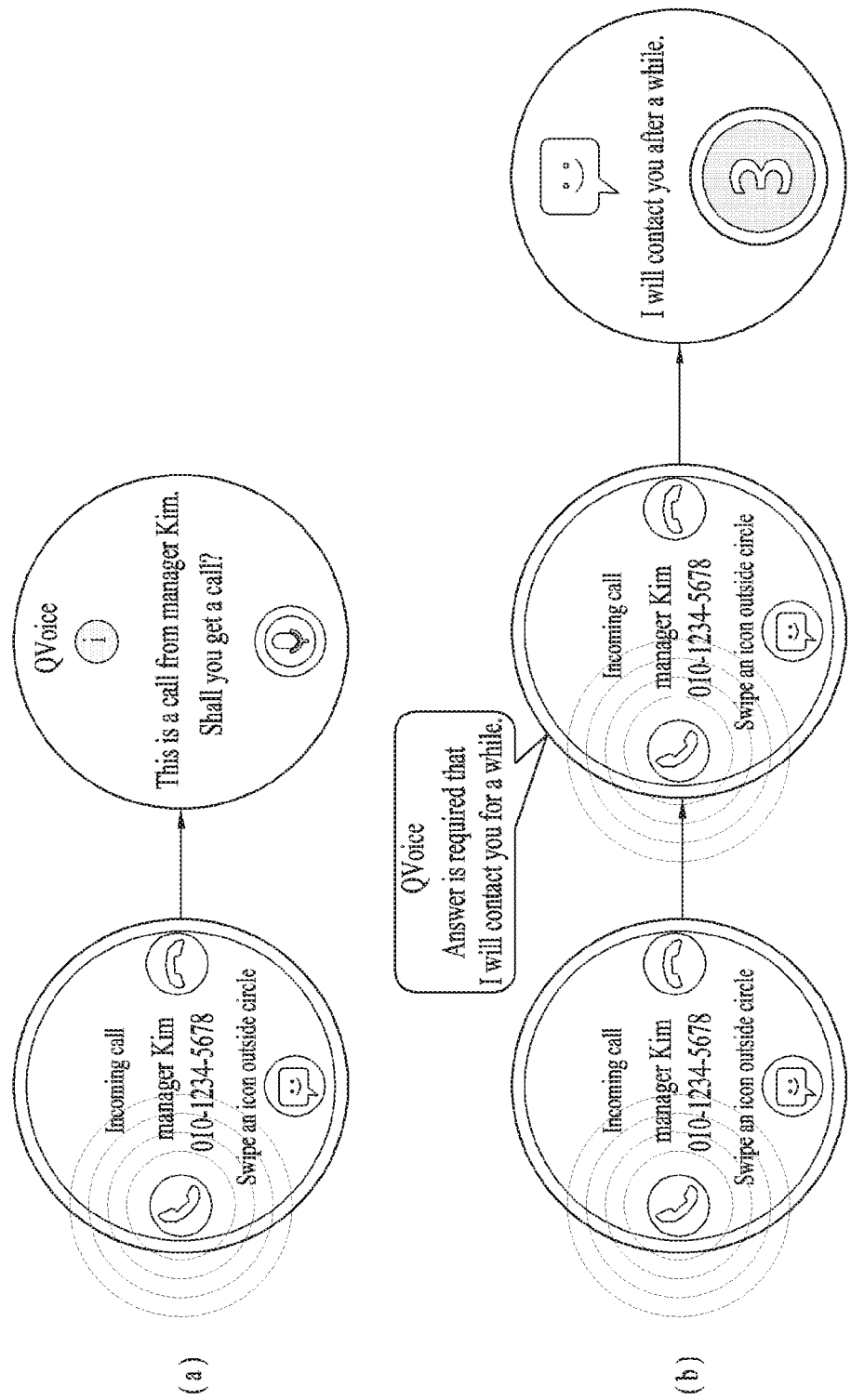
FIG. 8 illustrates an embodiment that a message of a call which is received is displayed differently depending on the amount of exercise of a user.

FIG. 8 illustrates an embodiment that a message of a call which is received is displayed differently depending on the exercise amount of a user.

The controller 180 may execute the special mode when the user is exercising. At this time, the controller 180 may determine whether exercise of the user corresponds to an initial stage or a peak stage close to a target amount. If an event occurs in the initial stage of exercise, the user may check the content of the event by temporarily stopping exercise or check the content of the event while exercising by temporarily lowering a tempo. On the other hand, if the event occurs in the peak stage of exercise, the user may desire to concentrate on exercise rather than check the content of the event. Therefore, it is required to display the content of the event differently depending on the exercise amount of the user.

FIG. 8 corresponds to situations that a call is received in a user who is exercising. FIG. 8(*a*) is a display embodiment in the initial stage that the user is about to start exercise. FIG. 8(*b*) is a display embodiment in the last stage that the user reaches a target exercise. The exercise amount may previously be stored, or may be determined by the controller 180 by using a sensor that may measure a blood amount of a user.

Referring to FIG. 8(*a*), the controller 180 may control sender information to be displayed on the display unit 151. The controller 180 may control a guide voice, which asks whether to receive the call, to be output. Moreover, the controller 180 may receive and process a voice input as to whether the user receives the call.

Referring to FIG. 8(*b*), the controller 180 may control sender information to be displayed on the display unit 151. The controller 180 may output a guide voice, which guides 'I will contact you after a while' to the user. If the user does not perform a separate input, the controller 180 may reject reception and transmit a message, which indicates 'I will contact you after a while' in the same manner as the guide voice. That is, the controller 180 may output a voice guide, which indicates that the user does not receive a call, when the exercise amount of the user is close to a target value. The guide voice and sent message are only exemplary.

Figure 9:
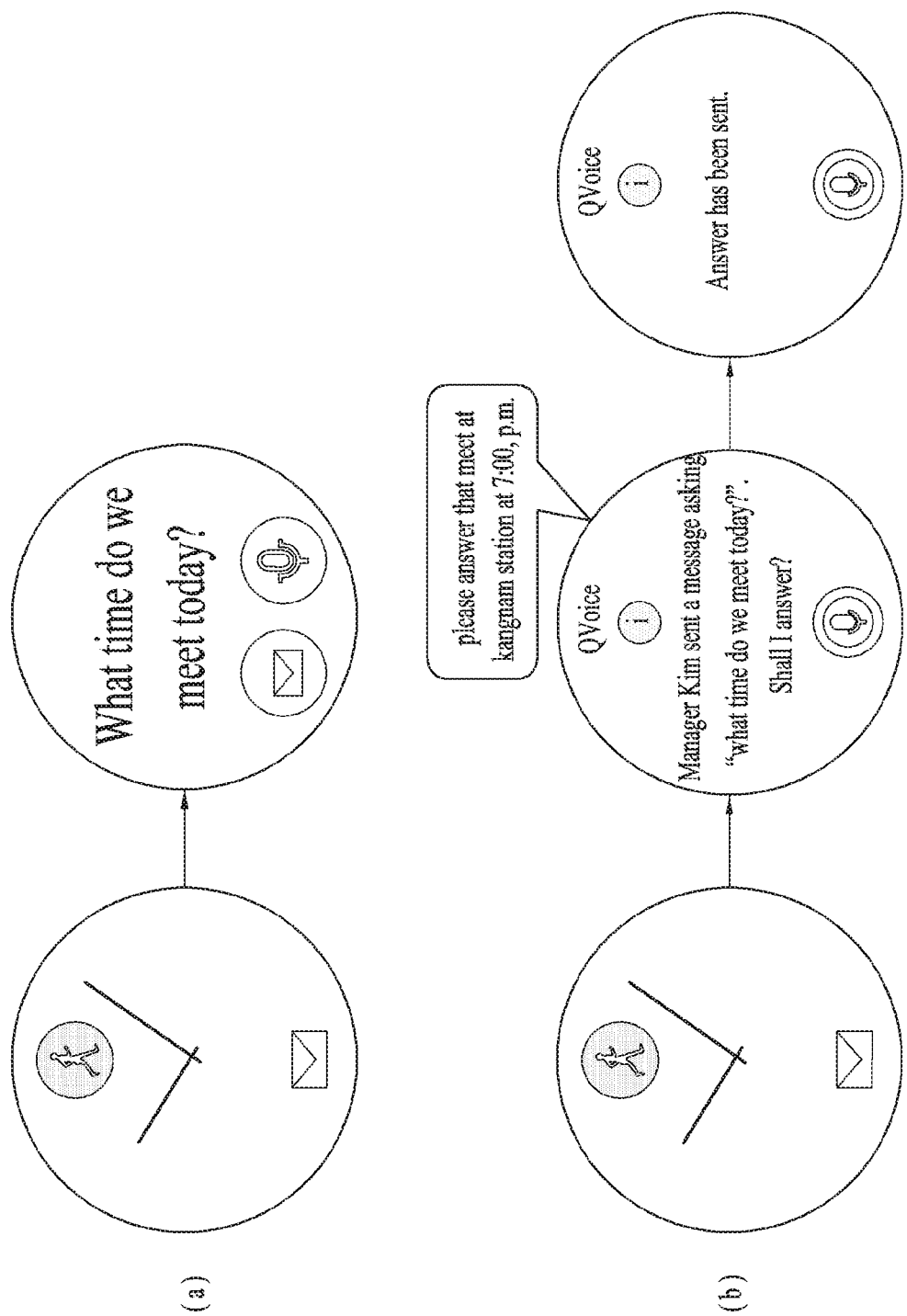
FIG. 9 illustrates an embodiment that a message which is received is displayed differently depending on the amount of exercise of a user.

FIG. 9 illustrates an embodiment that a message which is received is displayed differently depending on the exercise amount of a user.

It is assumed that a message is received when the user is exercising. Even in this case, contents displayed on the display unit 151 when the user is about to start exercise may be different from those displayed on the display unit 151 when the exercise amount of the user is close to a target amount.

FIG. 9 corresponds to situations that a message is received in a user who is exercising. FIG. 9(*a*) is a display embodiment in the initial stage that the user is about to start exercise. FIG. 9(*b*) is a display embodiment in the last stage that the user reaches a target exercise.

Referring to FIG. 9(*a*), the controller 180 may control information, which indicates the message is received, to be displayed on the display unit 151. The controller 180 may control a content of the message to be output as a text relatively greater than that of the normal mode. Moreover, the controller 180 may control an icon for an answer through a direct text input or answer drafting through a voice input as well as answer sending of the user, to be displayed on the display unit 151.

Referring to FIG. 9(*b*), the controller 180 may control information, which indicates that a message is received, to be displayed on the display unit 151. The controller 180 may output a content of the message as a voice or output the content of the message as a text relatively greater than that of the normal mode. Moreover, the controller 180 may output a guide voice, which asks a user whether to answer to the message. Moreover, when the user inputs a content of the answer as a voice, the controller 180 may draft the input voice input as a text and transmit the message. That is, the controller 180 may output whether to answer to the received message and a voice guide, which guides a voice input for an answering message, when the exercise amount of the user is close to a target value. The guide voice and sent message are only exemplary.

According to another embodiment of the present invention, the controller 180 may output a voice guide, which answers to the received message after the exercise amount of the user reaches the target exercise amount, when the exercise amount of the user is close to the target value.

Figure 10:
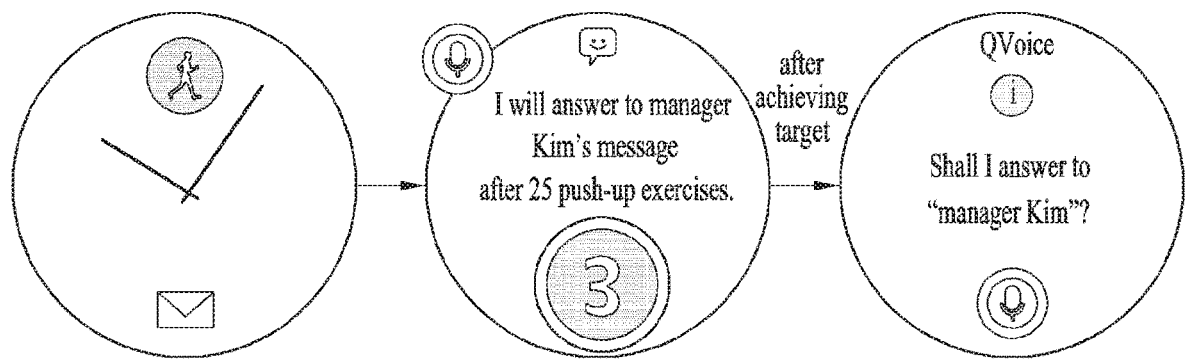
FIG. 10 illustrates an embodiment of a voice guide for responding to a received message after the amount of exercise of a user reaches a target exercise amount.

FIG. 10 illustrates an embodiment of a voice guide for answering to a received message after the exercise amount of a user reaches a target exercise amount.

Referring to FIG. 10, it is noted from the screen of the display unit 151 shown at a left side that a message is received when the user is exercising. At this time, the controller 180 may determine whether the exercising amount of the user has reached a target exercising amount of the user. If the exercising amount of the user does not reach the target exercising amount, the controller 180 may output a voice guide and a guide screen, which indicate that an answer to the received message will be made after the exercising amount reaches the target exercising amount. When the user reaches the target exercising amount, the controller 180 may output a voice guide and screen, which ask the user whether to answer to the received message.

Meanwhile, the wearable terminal 200 according to the present specification may display a size of play related input button differently depending on a play level of music when a music play application is operated when the user is exercising.

Figure 11:
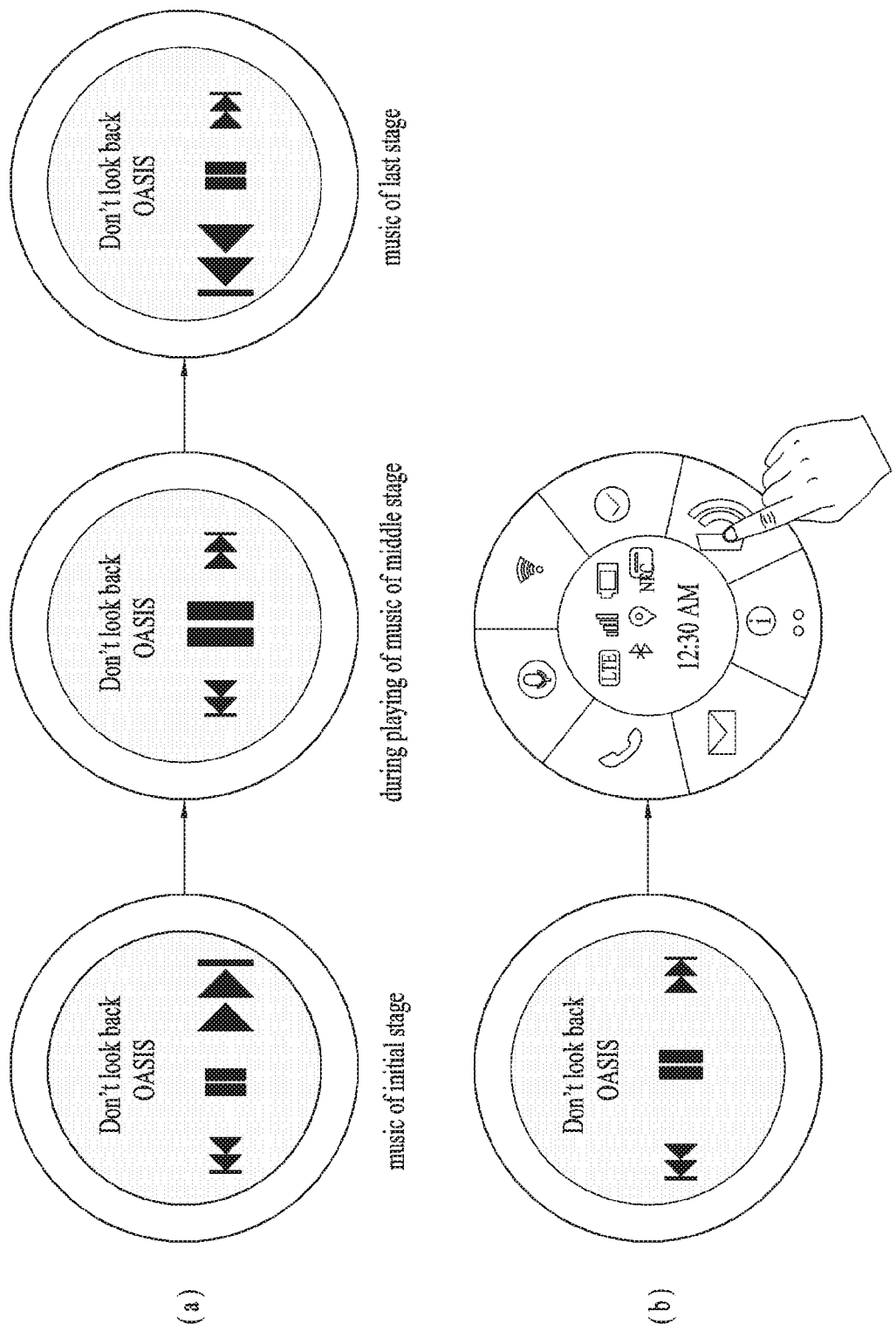
FIG. 11 illustrates an embodiment of a music play application when a user is exercising.

FIG. 11 illustrates an embodiment of a music play application when a user is exercising.

FIG. 11(*a*) corresponds to screens displayed on the display unit 151 in the order of play of initial stage, play of middle stage, and play of last stage. In case of music play of initial stage, the user is likely to perform a skip input to next music. Therefore, in case of music play of initial stage, the controller 180 may control an input button to next music to be displayed at a size relatively greater than that of another button. In case of music play of middle stage, the user is likely to perform an input for temporarily stopping music. Therefore, in case of music play of middle stage, the controller 180 may control an input button to stop music to be displayed at a size relatively greater than that of another button. In case of music play of last stage, the user is likely to perform an input for replaying music. Therefore, in case of music play of last stage, the controller 180 may control an input button for replaying music to be displayed at a size relatively greater than that of another button.

FIG. 11(*b*) is an embodiment that a shortcut menu is paged in the middle of playing music. The shortcut menu is a menu previously set by a user to immediately execute a specific function. If the shortcut menu is paged in the middle of playing music, the user is likely to page the shortcut menu to execute a function related to music play. Therefore, the controller 180 may control an icon for controlling a volume of a speaker to be displayed on the display unit 151 as an icon relatively greater than the other icons.

According to one embodiment of the present invention, the controller 180 may display a guide screen as to whether to transmit a message, which indicates that the user cannot receive a call when the call is received while a special mode is being executed.

Figure 12:
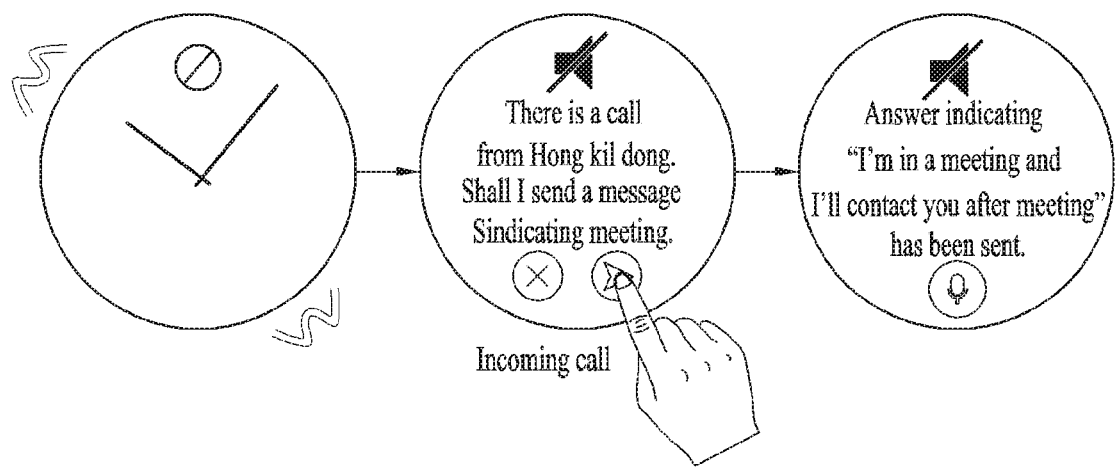
FIG. 12 illustrates an embodiment that a call is received when a user is in a meeting.

FIG. 12 illustrates an embodiment that a call is received when a user is in a meeting.

Referring to FIG. 12, it is noted from the display unit 151 shown at a left side that an incoming call is received. Since a user is in a meeting, the controller 180 may notify the user of the incoming call through vibration. Also, the controller 180 may display a guide screen as to whether to transmit a message indicating a situation that the user cannot receive the call, instead of guiding as to whether to receive the call. The controller 180 may display an answering result of the message notifying the sender of the situation that the user cannot receive the call, on the display unit 151 by receiving a user input.

Figure 13:
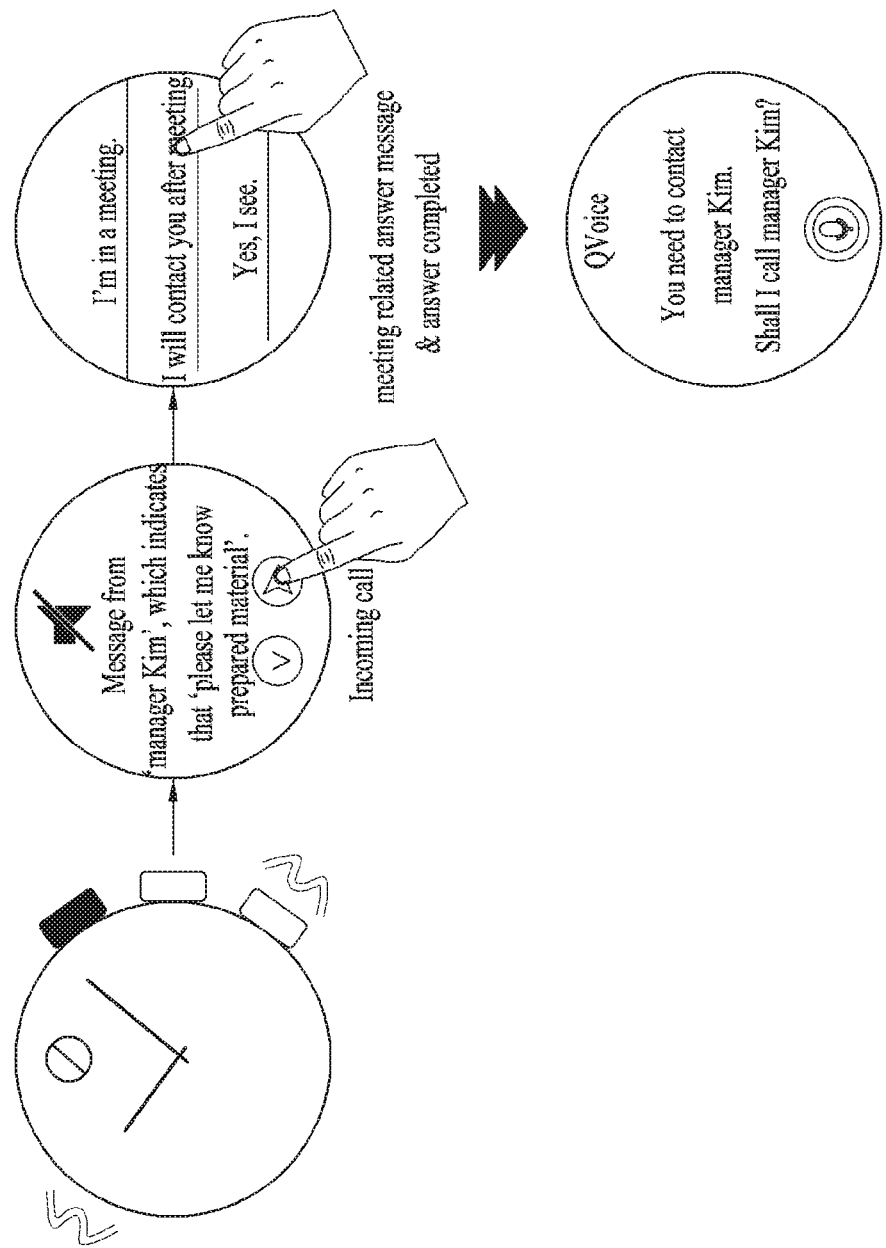
FIG. 13 illustrates an embodiment that a message is received when a user is in a meeting.

FIG. 13 illustrates an embodiment that a message is received when a user is in a meeting.

Referring to FIG. 13, it is noted from the display unit 151 shown at a left side that a message is received. Since a user is in a meeting, the controller 180 may notify the user of reception of the message through vibration. Also, the controller 180 may control a content of the message to be displayed on the display unit 151 when receiving a user input. According to one embodiment, the controller 180 may control the content of the message to be displayed on the display unit 151 only when the message is received from a preset sender. As a result, the user may selectively check only the message sent from an important person during meeting. Also, the controller 180 may display a guide screen as to an answer for the received message. The controller 180 may transmit a previously set answer message to the sender by receiving a user input. The controller 180 may display a guide screen for confirming that the user should try to contact the sender when the meeting is over.

According to one embodiment of the present invention, the controller 180 may control an alarm not to be executed when the user woke up earlier than an alarm timing which is previously set.

Figure 14:
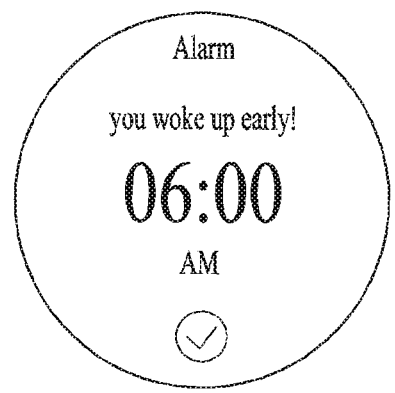
FIG. 14 illustrates an embodiment that a guide screen for notifying that an alarm is not executed is displayed.

FIG. 14 illustrates an embodiment that a guide screen for notifying that an alarm is not executed is displayed.

Referring to FIG. 14, it is noted that a guide screen as to that early woken-up of the user is displayed on the display unit 151. The controller 180 may determine whether the user has woken up earlier than the predetermined alarm timing, by using an acceleration sensor or a blood amount sensor. If the user has woken up earlier than the predetermined alarm timing, it is not required to execute the alarm. Therefore, the controller 180 may control the alarm not to be executed when the user has woken up earlier than the predetermined alarm timing. Also, the controller 180 may control a guide screen, which indicates that the alarm is not executed, to be displayed on the display unit 151.

According to one embodiment of the present specification, the controller 180 may control a guide screen, which checks whether the user receives an event, to be displayed on the display unit 151 when the event due to a call or message from a preset sender occurs.

Figure 15:
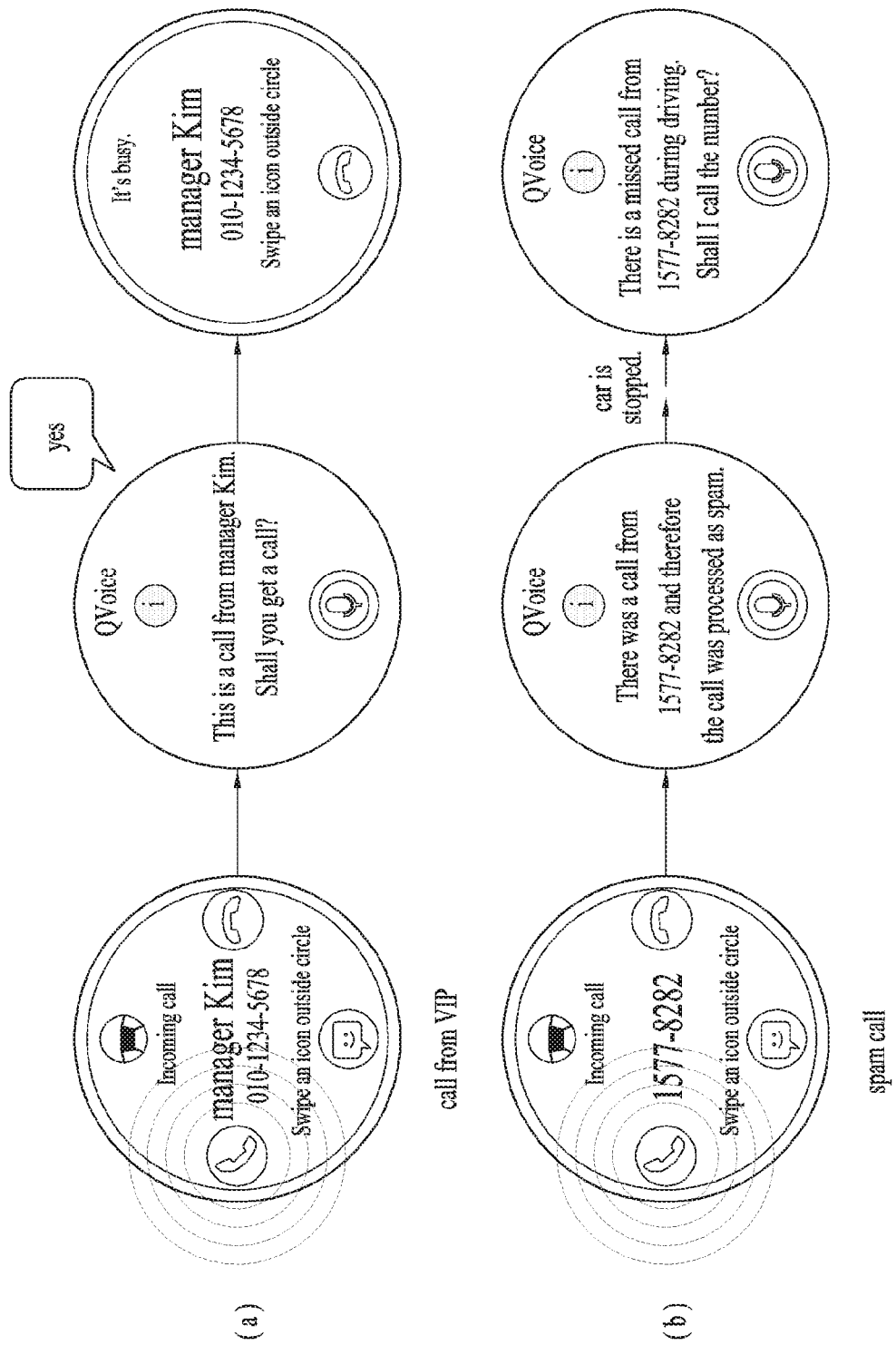
FIG. 15 illustrates an embodiment that a call is received from a preset sender during driving.

FIG. 15 illustrates an embodiment that a call is received from a preset sender during driving.

Referring to FIG. 15(*a*), it is noted from the screen of the display unit 151 shown at a left side that an incoming call from 'manager Kim' is received. At this time, the user is driving. Meanwhile, the user has previously set a contact address of the 'manager Kim' as an important sender. Therefore, the controller 180 may control a screen for guiding that the call is received from the 'manager Kim' to be displayed on the display unit 151 despite that the user is driving. Also, the controller 180 may control a voice for guiding that the call is received from the 'manager Kim' to be output through the audio output module 152. The controller 180 may execute a voice communication mode when a user input (button input, screen touch input, voice input, etc.) is received.

According to another embodiment of the present specification, the controller 180 may control a guide screen for confirming reception rejection to be displayed on the display unit 151 when an event due to a call or message from an unregistered sender occurs.

Referring to FIG. 15(*b*), it is noted from the screen of the display unit 151 shown at a left side that an incoming call from an unregistered sender is received. At this time, since the user is driving, the controller 180 may control a guide screen for confirming that the user rejects the call, to be displayed on the display unit 151. Afterwards, when a car of the user is stopped or driving ends, that is, when a special mode is switched to a normal mode, the controller 180 may control the guide screen for the event of which reception is rejected to be displayed on the display unit 151.

According to one embodiment of the present specification, the controller 180 may control an answer related to a content of the received message to be transmitted.

Figure 16:
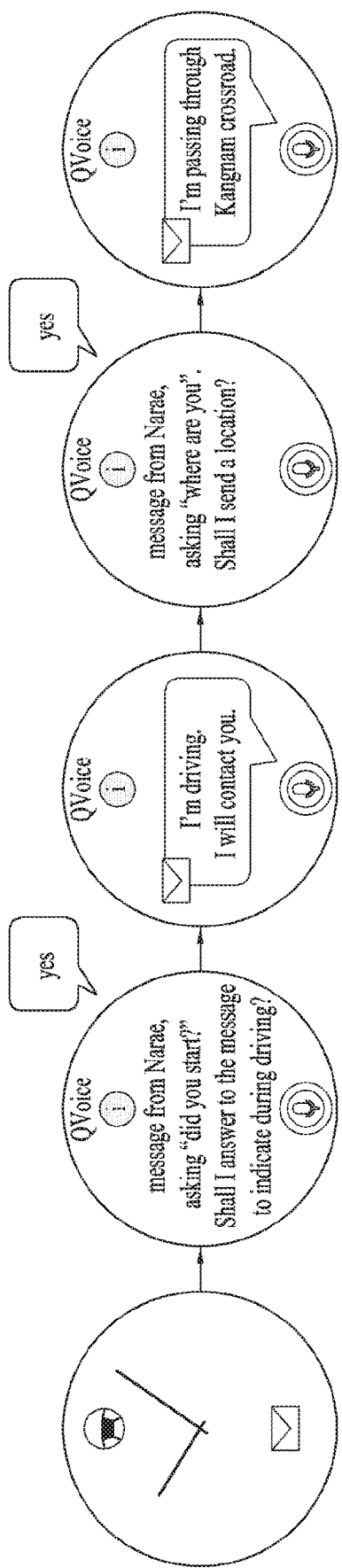
FIG. 16 illustrates an embodiment that an answer related to a message which is received is sent.

FIG. 16 illustrates an embodiment that an answer related to a message which is received is sent.

Referring to FIG. 16, it is noted that the user receives a message during driving. In the same manner as the aforementioned embodiment, the controller 180 may control a guide screen for guiding an answer notifying the message sender that the user is driving, to be displayed on the display unit 151. Moreover, if a content for asking a location of the user is included in the message, the controller 180 may control a guide screen for checking whether the location of the user is transmitted, to be displayed on the display unit 151. The controller 180 may transmit the location of the user to the message sender by using the location information module 115 when there is a grant input of the user.

According to one embodiment of the present invention, the controller 180 may control an application program related to the content of the received message to be executed.

Figure 17:
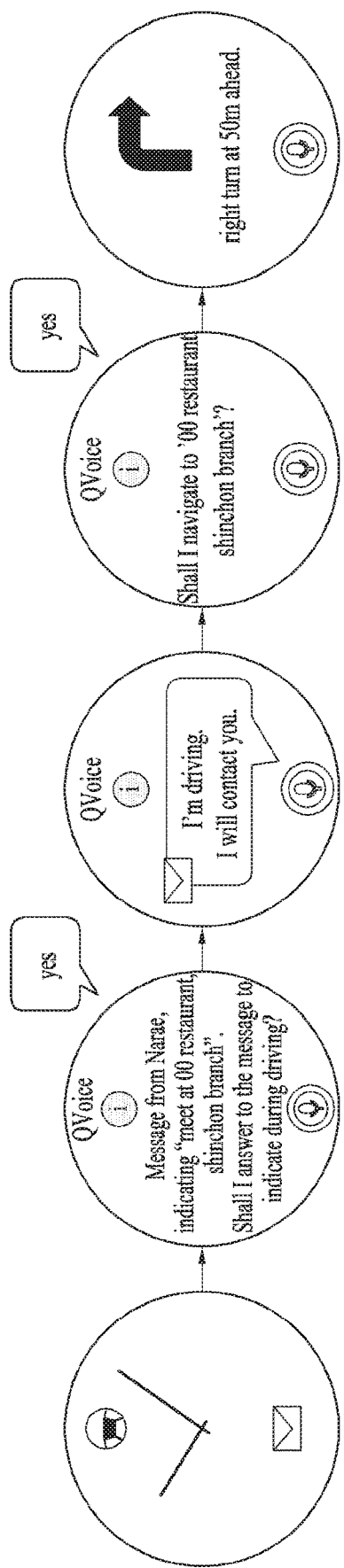
FIG. 17 illustrates an embodiment that an application program related to a message which is received is executed.

FIG. 17 illustrates an embodiment that an application program related to a message which is received is executed.

Referring to FIG. 17, it is noted that the user receives a message during driving. In the same manner as the aforementioned embodiment, the controller 180 may control a guide screen for guiding an answer notifying the message sender that the user is driving, to be displayed on the display unit 151. Moreover, if a specific location is included in the content of the message, the controller 180 may control a guide screen for asking the user whether to want a guide to the above location, to be displayed on the display unit 151. The controller 180 may execute a navigation program for guiding the specific location when there is a grant input of the user.

Figure 18:
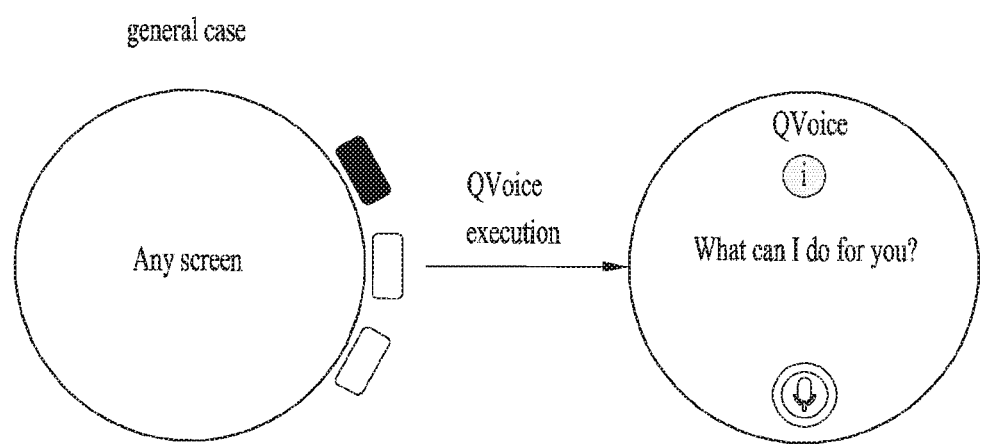
FIG. 18 is an exemplary view illustrating that a general voice command execution button is pushed.

FIG. 18 is an exemplary view illustrating that a general voice command execution button is pushed.

Referring to FIG. 18, it is noted that the user pushes a button located on an upper end at a right side of the wearable terminal 200. The button located on the upper end at the right side of the wearable terminal 200 is a button that may execute a voice command program to execute a received command by receiving a voice of the user. However, a method for executing the voice command program is not limited to the above example, and there may be various methods. In general case, when the button is pushed, the controller 180 controls a standby screen for a voice command of the user to be displayed on the display unit 151. In this case, the user speaks a voice command for indicating a desired operation, and the controller 180 executes an operation corresponding to the voice command. In this case, the user should express a detailed operation as a voice to execute a desired operation. That is, the user should command a specific application program and a specific operation. The voice command may be a lot of words and a long voice as the case may be.

Meanwhile, according to the present specification, when a user input is received while an application program is being executed, the controller 180 may control a screen for guiding the user whether an operation corresponding to the application program is executed, to be displayed on the display unit 151.

According to one embodiment of the present specification, when a user input is received while an application program for displaying a missed call or received message is being executed, the controller 180 may control a screen for guiding the user whether an operation corresponding to the missed call or received message is executed, to be displayed on the display unit 151.

Figure 19:
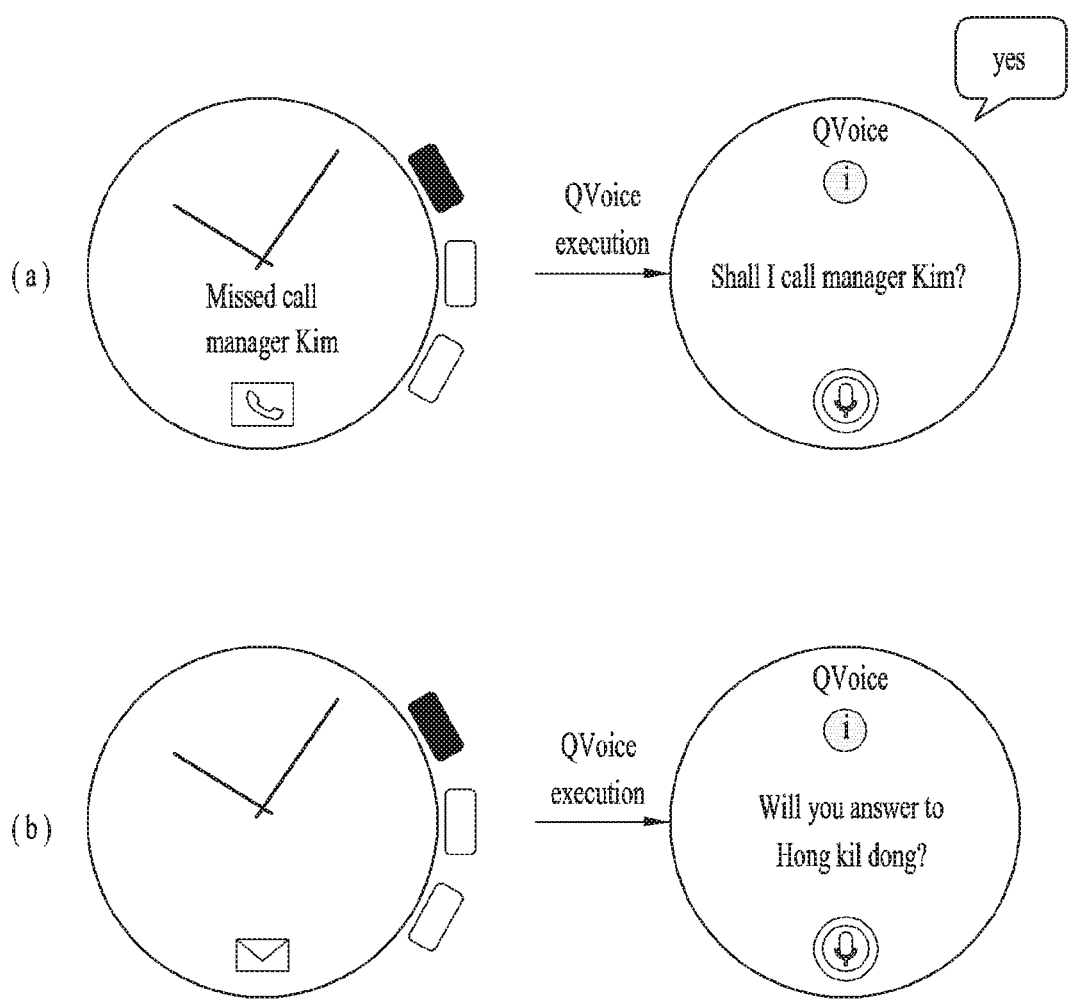
FIG. 19 is an exemplary view illustrating that a user input is received during execution of an application program for displaying a missed call or received message.

FIG. 19 is an exemplary view illustrating that a user input is received during execution of an application program for displaying a missed call or received message.

Referring to FIG. 19(*a*), it is noted that a screen for guiding a missed call is displayed on the display unit 151. At this time, when the user pushes a button, which may execute a voice command program, the controller 180 may control a screen for asking whether to call a sender of the missed call, to be displayed on the display unit 151 unlike FIG. 18. At this time, the user may input a simple voice command.

Referring to FIG. 19(*b*), it is noted that a screen for guiding reception of a message is displayed on the display unit 151. At this time, when the user pushes a button, which may execute a voice command program, the controller 180 may control a screen for asking whether to answer to a sender of the received message, to be displayed on the display unit 151 unlike FIG. 18. Likewise, the user may input a simple voice command.

According to another embodiment of the present invention, when a user input is received while an application program for displaying an event occurring in the wearable terminal 200 is being executed, the controller 180 may control a screen for guiding the user whether to execute an operation corresponding to the event, to be displayed on the display unit 151.

Figure 20:
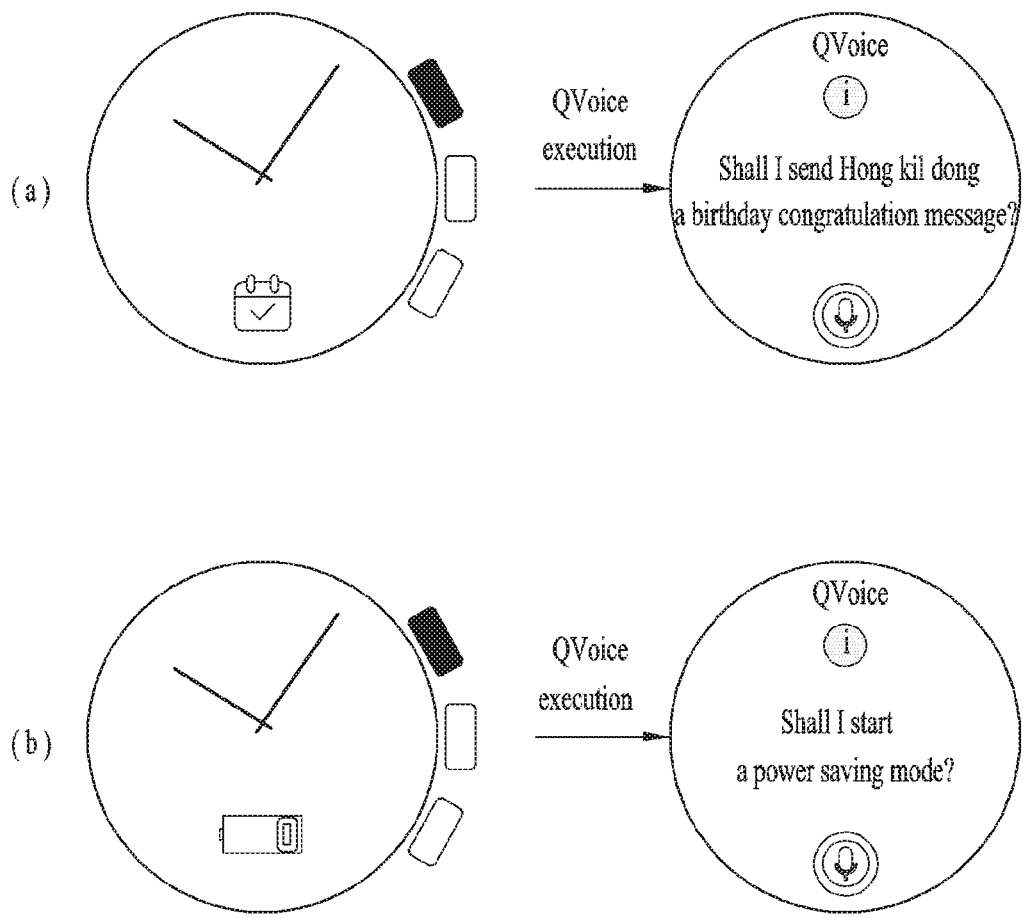
FIG. 20 is an exemplary view illustrating execution of an operation corresponding to an event occurring in a wearable terminal.

FIG. 20 is an exemplary view illustrating execution of an operation corresponding to an event occurring in a wearable terminal.

Referring to FIG. 20(*a*), it is noted that a calendar related application program is being executed in the display unit 151. The calendar related application program may generate an alarm to a user in accordance with date or time previously set by the user. At this time, when the user pushes a button, which may execute a voice command program, the controller 180 may control a screen for asking whether to send a message related to a stored date, to be displayed on the display unit 151 unlike FIG. 18. In this example, since a birthday is stored in the calendar, the message may be a birthday congratulation related message.

Referring to FIG. 20(*b*), it is noted that a battery related application program is being executed in the display unit 151. The battery related application program may generate an alarm to a user in respect of a battery state such as shortage of a charging amount of a battery. At this time, when the user pushes a button, which may execute a voice command program, the controller 180 may control a screen for asking whether to execute a battery control related mode, to be displayed on the display unit 151 unlike FIG. 18. In this example, since the alarm has been generated due to shortage of the charging amount of the battery, the controller 180 may execute a power saving mode.

According to another embodiment of the present specification, when a user input is received while a mail related application program is being executed, the controller 180 may control a screen for guiding the user whether to execute an operation corresponding to a mail displayed by the mail related application program, to be displayed on the display unit 151.

Figure 21:
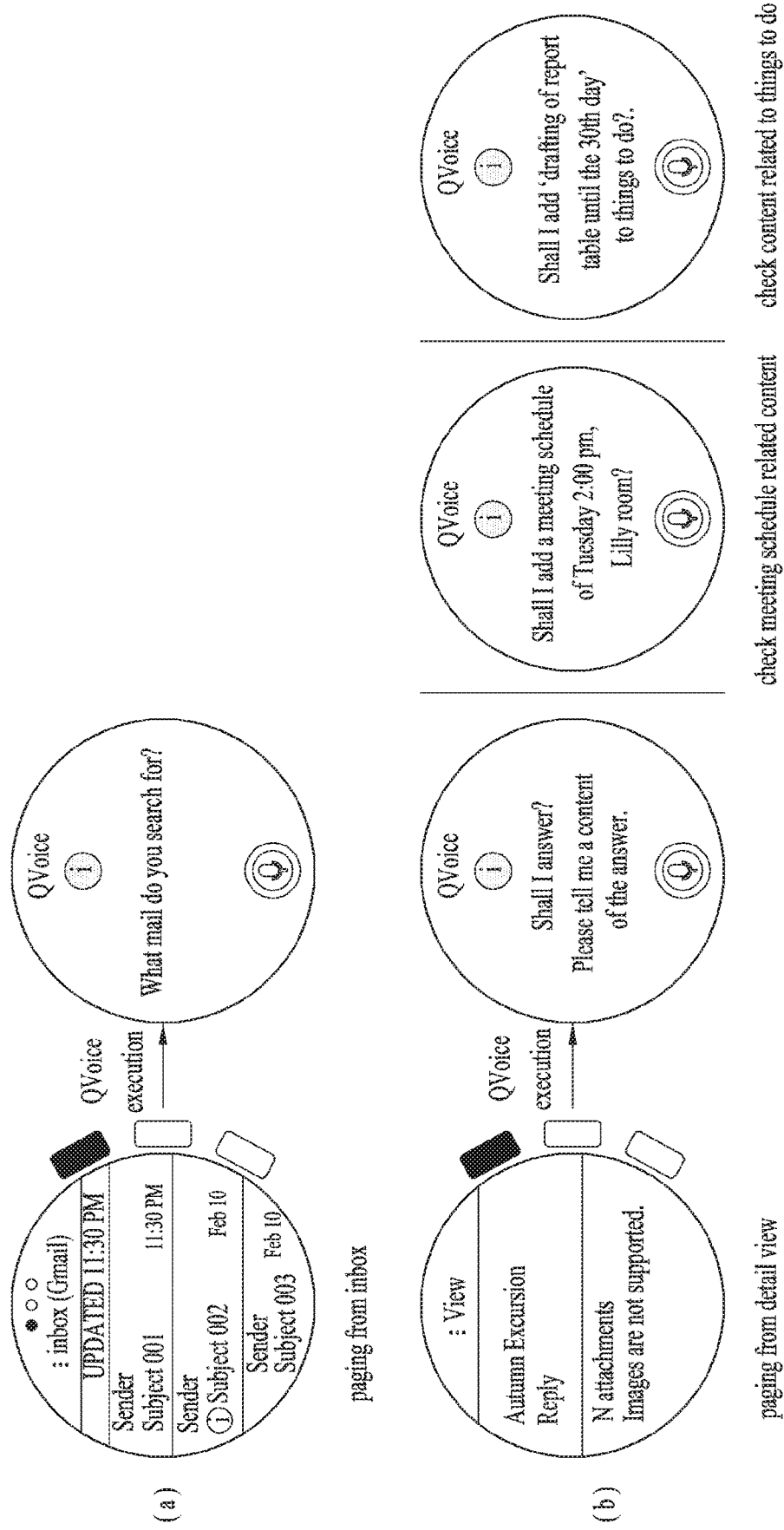
FIG. 21 is an exemplary view illustrating execution of an operation corresponding to a mail displayed by a mail related application program.

FIG. 21 is an exemplary view illustrating execution of an operation corresponding to a mail displayed by a mail related application program.

Referring to FIGS. 21(*a*) and 21(*b*), it is noted that a mail related application program is executed in the display unit 151. However, FIG. 21(*a*) corresponds to a screen for displaying a list of all the mails which are received, whereas FIG. 21(*b*) corresponds to a screen for displaying a content of a specific one of the received mails. At this time, when the user pushes a button, which may execute a voice command program, the controller 180 may control a screen for guiding the user whether to execute an operation corresponding to a mail displayed by the mail related application program, to be displayed on the display unit 151 unlike FIG. 18. First of all, in case of FIG. 21(*a*), it may be regarded that the user searches for a specific mail from the list of mails. Therefore, the controller 180 may control a screen for guiding the user whether to execute an operation related to mail search, to be displayed on the display unit 151. On the other hand, in case of FIG. 21(*b*), the user who has viewed a content of a specific mail may desire to answer to the mail or store a schedule. Therefore, the controller 180 may control a screen for guiding the user whether to execute an operation related to drafting of an answer mail, schedule addition, or storage of things to do, to be displayed on the display unit 151.

According to another embodiment of the present specification, when a user input is received while a multimedia play related application program is being executed, the controller 180 may control a screen for guiding the user whether to execute an operation corresponding to a screen displayed by the multimedia play related application program, to be displayed on the display unit 151.

Figure 22:
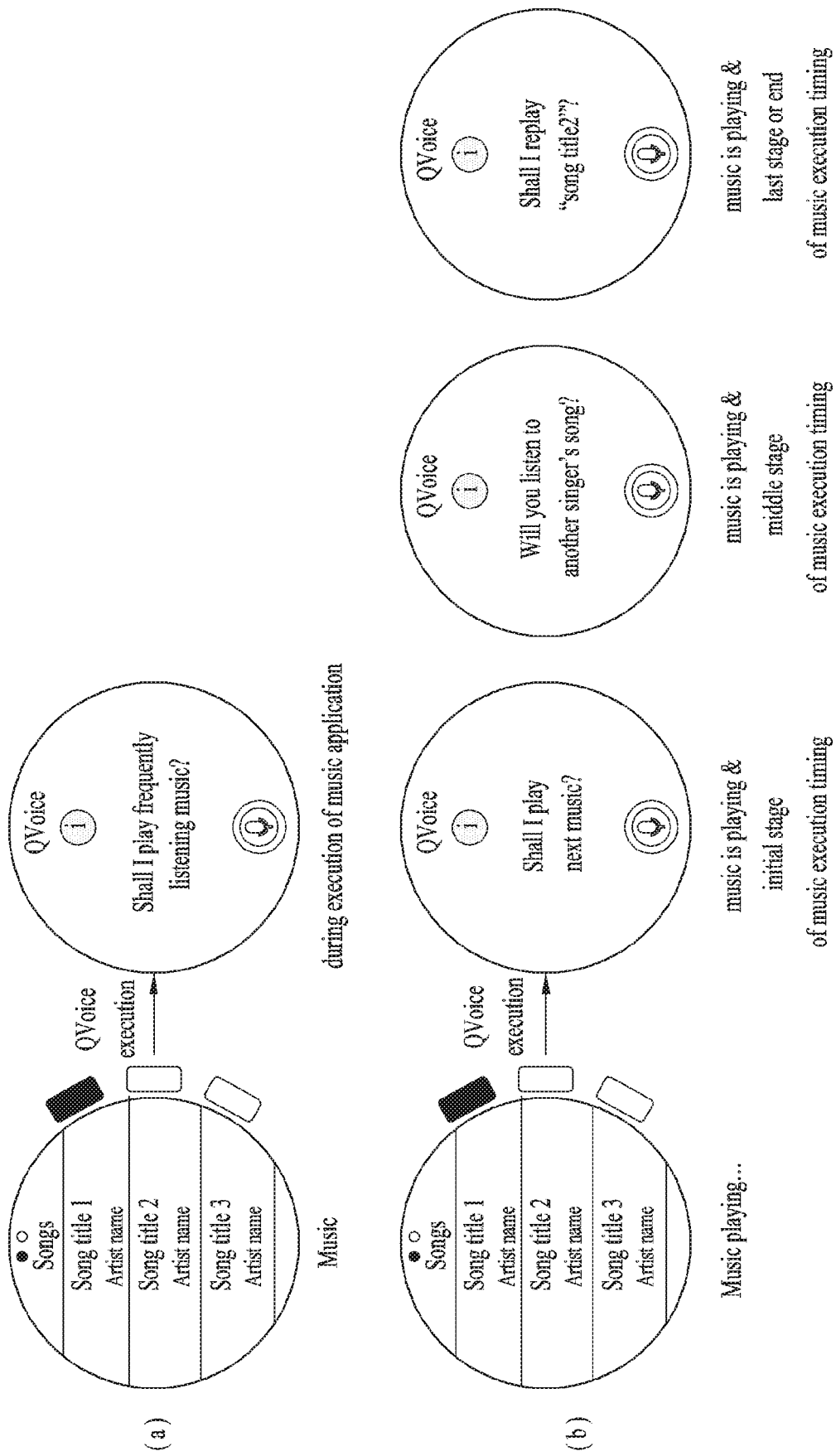
FIG. 22 is an exemplary view illustrating execution of an operation corresponding to information displayed by a music play related application program.

FIG. 22 is an exemplary view illustrating execution of an operation corresponding to information displayed by a music play related application program.

Referring to FIGS. 22(*a*) and 22(*b*), it is noted that a music play related application program is executed in the display unit 151. However, FIG. 22(*a*) corresponds to a screen for displaying a list of music which are stored, whereas FIG. 22(*b*) corresponds to a specific music play screen.

At this time, when the user pushes a button, which may execute a voice command program, the controller 180 may control a screen for guiding the user whether to execute an operation corresponding to a screen displayed by the music play related application program, to be displayed on the display unit 151 unlike FIG. 18. First of all, in case of FIG. 22(*a*), it may be regarded that the user intends to play specific music by searching for the specific music from the list of music. Therefore, the controller 180 may control a screen for guiding the user whether to execute an operation related to music search or play the specific music, to be displayed on the display unit 151. On the other hand, in case of FIG. 22(*b*), the user may desire to play another music during playing the specific music, stop play the music, or re-listen to the music. Therefore, the controller 180 may control a screen for guiding the user whether to execute an operation related to play of music, stop of music or re-listening to music, to be displayed on the display unit 151.

According to another embodiment of the present specification, when a user input is received while a call related application program is being executed, the controller 180 may control a screen for guiding the user whether to execute an operation corresponding to a screen displayed by the call related application program, to be displayed on the display unit 151.

Figure 23:
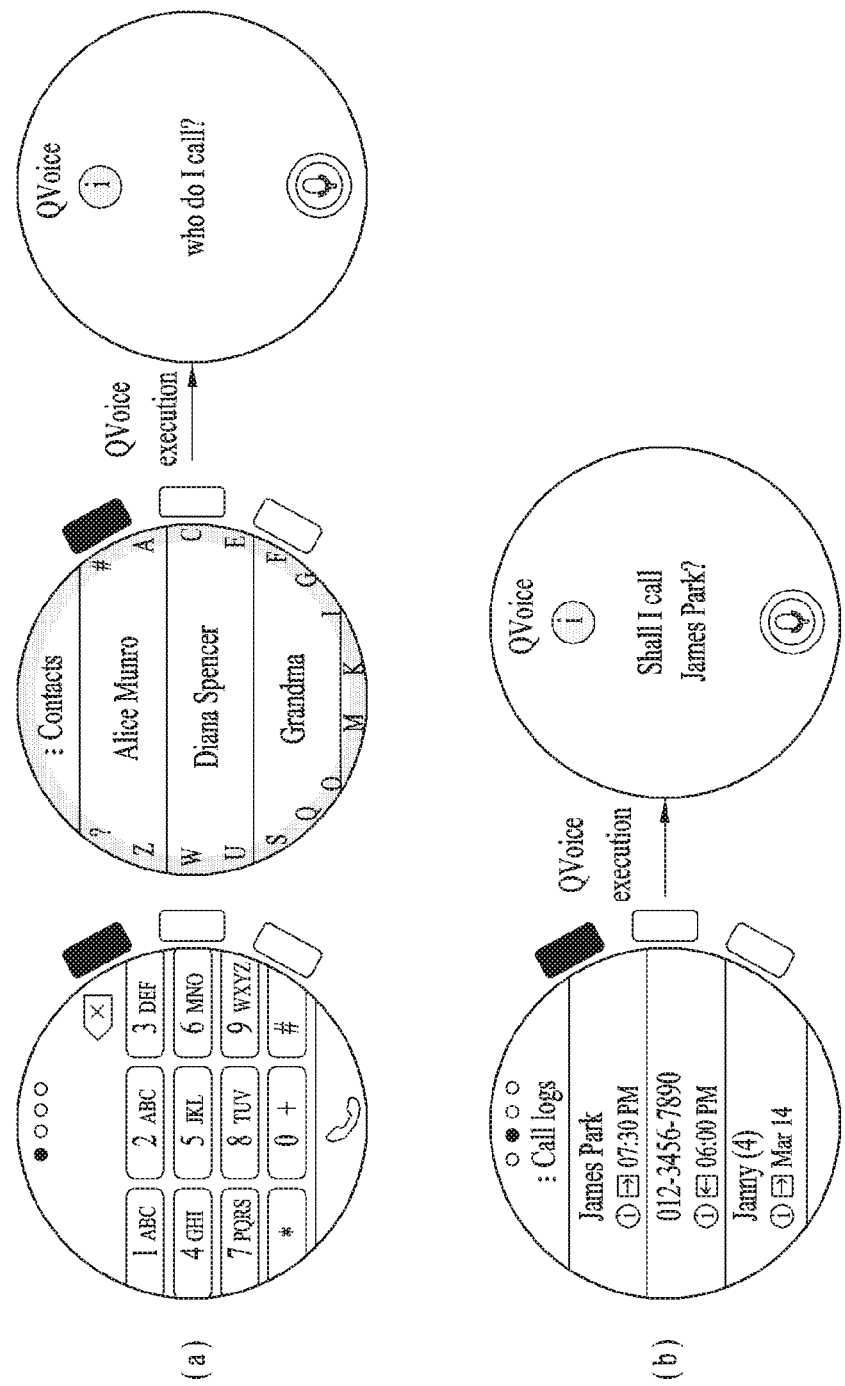
FIG. 23 is an exemplary view illustrating execution of an operation corresponding to information displayed by a call related application program.

FIG. 23 is an exemplary view illustrating execution of an operation corresponding to information displayed by a call related application program.

Referring to FIGS. 23(*a*) and 23(*b*), it is noted that a call related application program is executed in the display unit 151. However, FIG. 23(*a*) corresponds to a screen for displaying numbers, whereas FIG. 23(*b*) corresponds to a screen where a call record is displayed.

At this time, when the user pushes a button, which may execute a voice command program, the controller 180 may control a screen for guiding the user whether to execute an operation corresponding to a screen displayed by the call related application program, to be displayed on the display unit 151 unlike FIG. 18. First of all, in case of FIG. 23(*a*), it may be regarded that the user intends to call a specific one of contact addresses which are stored. Therefore, the controller 180 may control a screen for guiding the user whether to execute an operation related to contact address search or call a specific person, to be displayed on the display unit 151. On the other hand, in case of FIG. 23(*b*), if the user views the screen where a call record is displayed, the user may desire to call a recent number or frequently called number. Therefore, the controller 180 may control a screen for guiding the user whether to call a specific number such as a recent number among numbers displayed on the call record, to be displayed on the display unit 151.

According to another embodiment of the present specification, when an alarm is executed, the controller 180 may control a screen for guiding the user whether to execute an operation corresponding to a user input, to be displayed on the display unit 151.

Figure 24:
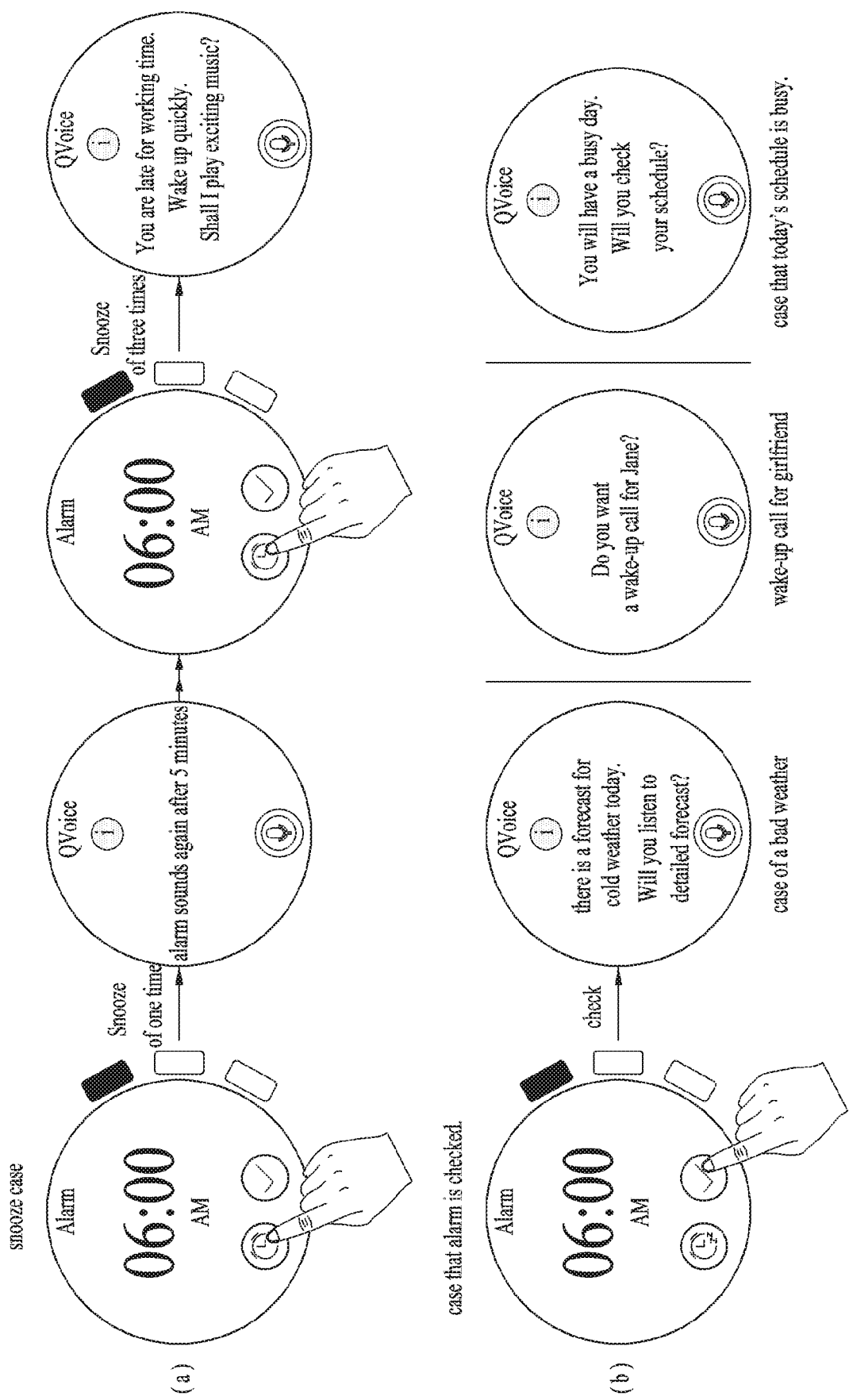
FIG. 24 is an exemplary view illustrating execution of an operation corresponding to a user input when an alarm is executed.

FIG. 24 is an exemplary view illustrating execution of an operation corresponding to a user input when an alarm is executed.

Referring to FIGS. 24(*a*) and 24(*b*), it is noted that an alarm sounds in the display unit 151. However, FIG. 24(*a*) corresponds to a screen where the user pushes 'snooze', whereas FIG. 24(*b*) corresponds to a screen where the user pushes alarm confirmation (end).

First of all, in case of FIG. 24(*a*), the controller 180 may sound an alarm at a predetermined time interval until the user pushes alarm confirmation. At this time, the controller 180 may recognize that the user fails to wake up when the user pushes 'snooze' at a predetermined number of times or more, and may control a screen for encouraging wake-up or a screen for guiding the user whether to play music for assisting wake-up, to be displayed on the display unit 151.

On the other hand, in case of FIG. 24(*b*), since the user has pushed alarm confirmation (end), the controller 180 may recognize that the user has woken up. Therefore, the controller 180 may control a screen for guiding weather, behavior repeatedly carried out by the user after wake-up, or a screen for guiding a stored schedule, to be displayed on the display unit 151.

Meanwhile, the above-described present invention may be implemented in a medium in which a program is recorded, as a code that can be read by a computer. Example of the medium that can be read by a computer include an HDD (hard disk drive), an SSD (solid state disk), an SDD (silicon disk drive), a ROM, a RAM, a CD-ROM, a magnetic tape, a floppy disk, and an optical data storage unit. Also, another example of the recording medium may be implemented in a type of carrier wave (for example, transmission through Internet). Also, the computer may include the controller 180 of the terminal. Thus, the above detailed description is to be considered in all respects as illustrative and not restrictive. The scope of the present invention should be determined by reasonable interpretation of the appended claims and all changes which come within the equivalent scope of the invention are included in the scope of the invention.

MODE FOR CARRYING OUT THE INVENTION

Various embodiments have been described in the best mode for carrying out the present specification. Various modifications and variations can be made in the present invention by persons skilled in the art within spirits and scope of the present invention, and are included in the gist and range of the present invention defined in the accompanying claims.

INDUSTRIAL APPLICABILITY

The present specification may fully or partially be applied to electronic devices.

The invention claimed is:

1. A wearable terminal comprising:
   a band coupled with a main body and configured to be worn on a wrist;
   a display provided on the main body;
   a sensor configured to collect information for determining a user situation; and
   a controller configured to:
      execute a normal mode when the user situation does not correspond to a predetermined situation based on the information collected by the sensor;
      execute a special mode when the user situation corresponds to the predetermined situation based on the information collected by the sensor;
      cause the display to display content of an event differently based on an amount of exercise performed by a user in response to the event occurring in the special mode; and
      cause output of a voice guide in response to a call received from a sender without requiring an additional user input, the voice guide output differently based on the amount of the exercise such that:
         a first voice guide is output when the amount of the exercise is within a threshold range of a target exercise amount value in the special mode, the first output voice guide informing that the user cannot receive the call; and
         a second voice guide is output when the amount of the exercise is not within the threshold range of the target exercise amount value in the special mode, the second voice guide asking the user whether to receive the call.

2. The wearable terminal according to claim 1, wherein the content of the event is divided into a plurality of parts when the event occurs in the special mode such that each part of the plurality of parts is displayed one-by-one in a number of times, the number of times being greater than a number of time for displaying the content in the normal mode.

3. The wearable terminal according to claim 1, wherein the controller is further configured to execute the special mode when the user is outdoor such that the content of the event is displayed as a text or icon in a first size by using externally received weather information, the first size being greater than a second size of the text or icon that is displayed in the normal mode.

4. The wearable terminal according to claim 1, wherein the controller is further configured to switch from the special mode to the normal mode according to a change of the situation when the event occurs in the special mode.

5. The wearable terminal according to claim 1, wherein the controller is further configured to cause output of content of an email as voice when the email is received in the special mode.

6. The wearable terminal according to claim 1, wherein the controller is further configured to cause output of a third voice guide in response to a message received when the amount of the exercise is within the threshold range of the target exercise amount value in the special mode, the third output voice guide guiding the user whether to answer the received message and guiding the user to receive a voice input for replying to the received message.

7. The wearable terminal according to claim 1, wherein the controller is further configured to cause output of a third voice guide in response to a message received when the amount of the exercise is within the threshold range of the target exercise amount value in the special mode, the third output voice guide informing that a reply to the received message will follow after the amount of the exercise reaches the target exercise amount value.

8. The wearable terminal according to claim 1, wherein, when the event relates to a call or message received from a registered sender, the controller is further configured to cause the display to display a guide screen for inquiring of the user whether to accept the call or message.

9. The wearable terminal according to claim 8, wherein the controller is further configured to cause transmission of a reply related to content of the received message.

10. The wearable terminal according to claim 8, wherein the controller is further configured to execute an application program related to content of the received message.

11. The wearable terminal according to claim 8, wherein, when the event relates to a call or message received from an unregistered sender, the controller is further configured to cause the display to display a first guide screen for inquiring of the user whether to reject the call or message.

12. The wearable terminal according to claim 11, wherein the controller is further configured to cause the display to display a second guide screen for informing the user of the rejected call or message when the special mode ends.

13. The wearable terminal according to claim 1, wherein the controller is further configured to:
   reject the call; and
   cause transmission of a predetermined message to the sender.

14. The wearable terminal according to claim 13, wherein the predetermined message indicates that the user will contact the sender later.

15. The wearable terminal according to claim 1, wherein:
the normal mode is executed when the user is relatively less restricted in checking the display; and
the special mode is executed when the user is relatively more restricted in checking the display.

16. The wearable terminal according to claim 15, wherein the predetermined situation comprises a situation when the user is seated.

17. The wearable terminal according to claim 16, wherein the predetermined situation excludes a situation when the user is running, walking, driving, exercising, or in a meeting.

18. The wearable terminal according to claim 1, wherein the amount of the exercise is determined by measuring blood flow of the user.

19. The wearable terminal according to claim 1, wherein the controller is further configured to transmit a message to the sender when no user input is received in response to the first voice guide.

20. The wearable terminal according to claim 1, wherein the normal mode is executed when the user situation corresponds to a situation in which no or little exercise is performed by a user.

* * * * *